US012659496B2

(12) United States Patent
Yu et al.

(10) Patent No.: US 12,659,496 B2
(45) Date of Patent: Jun. 16, 2026

(54) RESOLUTION-BASED DECODING AND ENCODING METHODS AND BITSTREAM

(71) Applicants: ZHEJIANG UNIVERSITY, Hangzhou (CN); GUANGDONG OPPO MOBILE TELECOMMUNICATIONS CORP., LTD., Dongguan (CN)

(72) Inventors: Lu Yu, Dongguan (CN); Xiake Jin, Dongguan (CN); Chuchu Wang, Dongguan (CN); Sicheng Li, Dongguan (CN); Zhenyu Dai, Dongguan (CN)

(73) Assignees: ZHEJIANG UNIVERSITY, Hangzhou (CN); GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/787,989

(22) Filed: Jul. 29, 2024

(65) Prior Publication Data

US 2024/0388729 A1 Nov. 21, 2024

Related U.S. Application Data

(63) Continuation of application No. PCT/CN2022/075268, filed on Jan. 30, 2022.

(51) Int. Cl.
H04N 19/30 (2014.01)
H04N 19/17 (2014.01)
H04N 19/46 (2014.01)

(52) U.S. Cl.
CPC ............. H04N 19/30 (2014.11); H04N 19/17 (2014.11); H04N 19/46 (2014.11)

(58) Field of Classification Search
CPC ...... H04N 19/119; H04N 19/17; H04N 19/30; H04N 19/46; H04N 19/597; H04N 19/70
(Continued)

(56) References Cited

U.S. PATENT DOCUMENTS

2019/0213714 A1 7/2019 Neti et al.
2020/0351522 A1* 11/2020 Zhang .................. H04N 19/597
(Continued)

FOREIGN PATENT DOCUMENTS

CN 112188180 1/2021
KR 102013240 B1 * 8/2019 ........... H04N 19/176
KR 20210027091 A * 3/2021 ........... H04N 13/366

OTHER PUBLICATIONS

WIPO, International Search Report for International Application No. PCT/CN2022/075268, Nov. 1, 2022.

*Primary Examiner* — Behrooz M Senfi
(74) *Attorney, Agent, or Firm* — Hodgson Russ LLP

(57) ABSTRACT

Embodiments of the disclosure provide resolution-based decoding and encoding methods and a bitstream. The method includes the following. A bitstream is parsed to obtain a current patch. Whether the current patch is a patch whose resolution is to be changed is determined. When the current patch is a patch whose resolution is to be changed, the bitstream is parsed to obtain a scaling-rate parameter of the current patch. A scaling factor for the current patch is determined based on the scaling-rate parameter of the current patch. Coordinates of the current patch in a three-dimension (3D) space coordinate system are obtained based on the scaling factor for the current patch.

18 Claims, 8 Drawing Sheets

(58) Field of Classification Search
USPC ..................................................... 375/240.26
See application file for complete search history.

(56) References Cited

U.S. PATENT DOCUMENTS

2020/0380696 A1    12/2020  Feng et al.
2021/0005006 A1*    1/2021  Oh .................... H04N 21/85406
2023/0222694 A1*    7/2023  Oh ........................... G06T 7/194
                                                                    382/232

* cited by examiner

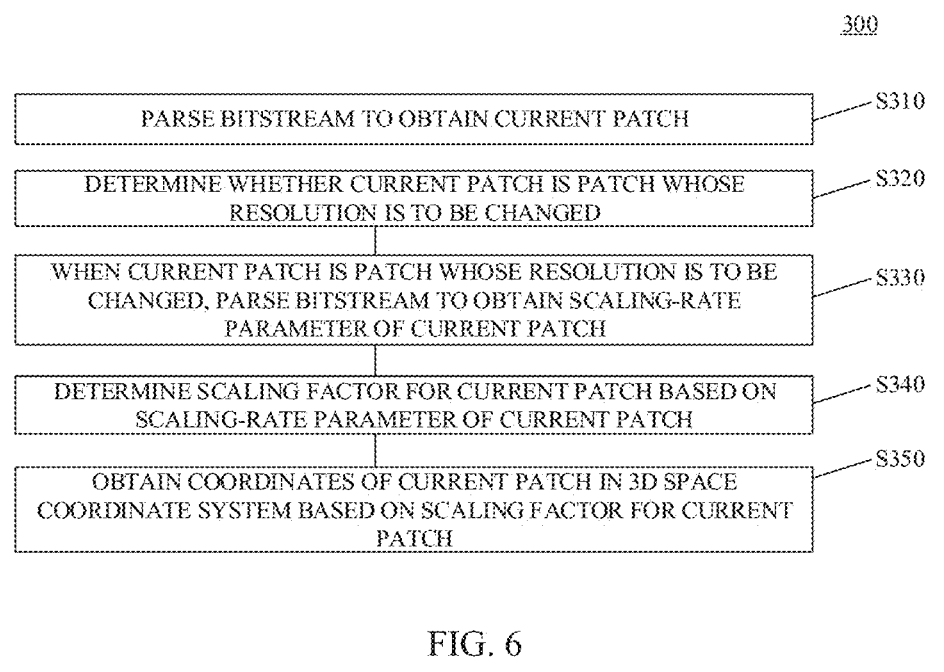

300

PARSE BITSTREAM TO OBTAIN CURRENT PATCH — S310

DETERMINE WHETHER CURRENT PATCH IS PATCH WHOSE RESOLUTION IS TO BE CHANGED — S320

WHEN CURRENT PATCH IS PATCH WHOSE RESOLUTION IS TO BE CHANGED, PARSE BITSTREAM TO OBTAIN SCALING-RATE PARAMETER OF CURRENT PATCH — S330

DETERMINE SCALING FACTOR FOR CURRENT PATCH BASED ON SCALING-RATE PARAMETER OF CURRENT PATCH — S340

OBTAIN COORDINATES OF CURRENT PATCH IN 3D SPACE COORDINATE SYSTEM BASED ON SCALING FACTOR FOR CURRENT PATCH — S350

FIG. 6

RESOLUTION-BASED DECODING AND ENCODING METHODS AND BITSTREAM

CROSS REFERENCE TO RELATED APPLICATION(S)

This application is a continuation of International Application No. PCT/CN2022/075268, filed Jan. 30, 2022, the entire disclosure of which is incorporated herein by reference.

TECHNICAL FIELD

Embodiments of the disclosure relate to the technical field of picture coding, and more specifically to resolution-based decoding and encoding methods and a bitstream.

BACKGROUND

In the moving picture experts group immersive video (MIV) decoding process, atlases may be converted from an atlas coordinate system to a three-dimension (3D) space coordinate system by using the same scaling factor, so as to obtain a 3D viewport from a view of a user. Each atlas may contain one or more patches, and each patch may be a patch in a certain view. Specifically, for all patches with a special view in the atlas, a scaling factor for these patches is obtained through calculation according to an atlas-level scaling parameter read from a bitstream. The scaling factor for each patch includes a width-scaling factor and a height-scaling factor. In addition, for patches with a normal view in the atlas, instead of reading a scaling factor from the bitstream, a default scaling factor can be used directly, for example, both a default width-scaling factor and a default height-scaling factor have a value of 1. That is to say, the same scaling factor is used for all the patches in the special view, and the constant default scaling factor is used for all the patches in the normal view.

However, in a case where the same scaling factor is used for all the patches in the special view, when different patches in the special view are of different importance, the patches parsed by a decoding end may fail to completely express information, which reduces the quality of a decoded picture. Similarly, in a case where the scaling factor for all the patches in the normal view defaults to 1, when a relatively important patch exists in the normal view, the patches parsed by the decoding end may fail to completely express information, which reduces the quality of the decoded picture.

SUMMARY

In a first aspect, a resolution-based decoding method is provided in the disclosure. The method includes the following. A bitstream is parsed to obtain a current patch. Whether the current patch is a patch whose resolution is to be changed is determined. When the current patch is a patch whose resolution is to be changed, the bitstream is parsed to obtain a scaling-rate parameter of the current patch. A scaling factor for the current patch is determined based on the scaling-rate parameter of the current patch. Coordinates of the current patch in a three-dimension (3D) space coordinate system are obtained based on the scaling factor for the current patch.

In a second aspect, a resolution-based encoding method is provided in the disclosure. The method includes the following. A current patch is obtained. Whether the current patch is a patch whose resolution is to be changed is determined.

When the current patch is a patch whose resolution is to be changed, a scaling-rate parameter of the current patch is signalled into a bitstream.

In a third aspect, a bitstream generated according to a resolution-based encoding method is provided in the disclosure. The method includes the following. A current patch is obtained. Whether the current patch is a patch whose resolution is to be changed is determined. When the current patch is a patch whose resolution is to be changed, a scaling-rate parameter of the current patch is signalled into a bitstream.

BRIEF DESCRIPTION OF THE DRAWINGS

FIG. 6 is a schematic flowchart of a resolution-based decoding method provided in embodiments of the disclosure.

DETAILED DESCRIPTION

The following will describe technical solutions of embodiments of the disclosure with reference to the accompanying drawings.

Figure 1:
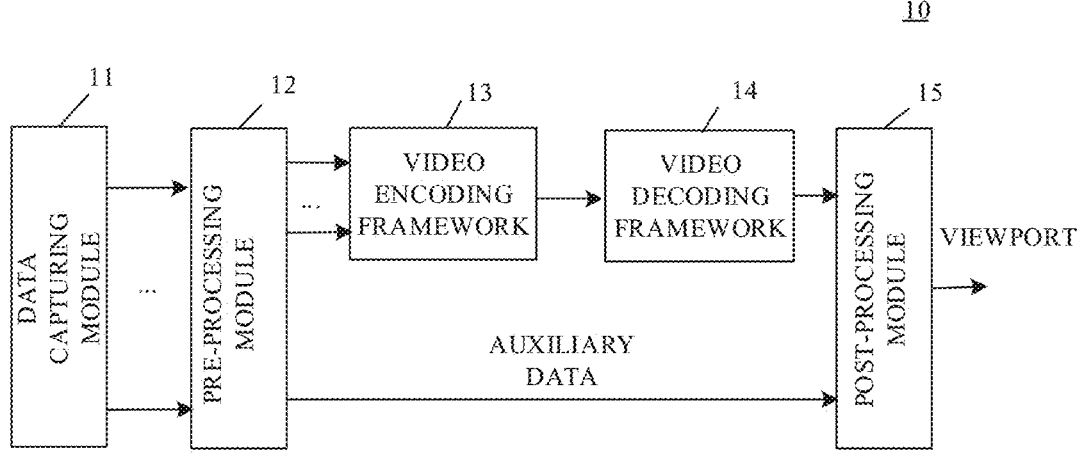
FIG. 1 is an example of a moving picture experts group immersive video (MIV) coding system provided in embodiments of the disclosure.

FIG. 1 is an example of a moving picture experts group immersive video (MIV) coding system 10 provided in embodiments of the disclosure.

As illustrated in FIG. 1, the MIV coding system 10 may be roughly divided into the following modules according to task lines: a data capturing module 11, a pre-processing module 12, a video encoding framework 13, a video decoding framework 14, and a post-processing module 15.

The data capturing module 11 is configured to capture data. The data captured by the data capturing module 11 not only includes texture information, but also includes depth information that is in one-to-one correspondence with texture information. The texture information may be a three-channel colour image, and the depth information may be a depth map. Optionally, a sample value of the depth map may reflect a distance metric from a corresponding point to a capturing device, that is, the depth map may be geometry information.

The pre-processing module 12 is configured to organize and express the data captured by the data capturing module 11, so as to obtain a to-be-encoded video. An input source format of the pre-processing module 12 is a multi-view texture plus depth video, and a format of the video may be a planar video with perspective projection or a panoramic video. Specifically, after the data capturing module 11 captures corresponding video sequences via cameras at different positions, the pre-processing module 12 may first perform illumination equalization and colour correction on pictures in the video sequences, and may further perform camera calibration and image calibration. If a format of the video captured by the data capturing module 11 is the panoramic video, the pre-processing module 12 may further stitch images in the panoramic video by using an image-stitching technology, and map a stitched atlas into a two-dimension (2D) planar video.

Figure 2:
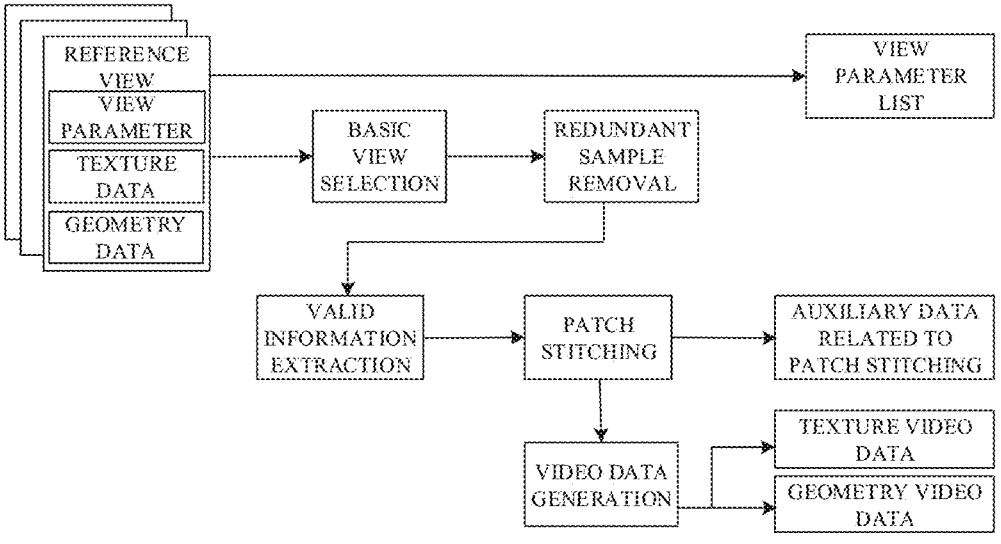
FIG. 2 is an example of a pre-processing process provided in embodiments of the disclosure.

FIG. 2 is an example of a pre-processing process provided in embodiments of the disclosure.

As illustrated in FIG. 2, reference views are views used by the data capturing module 11 for capturing data, and the reference views can be associated with each other via view parameters, texture data, and geometry data. The pre-processing module 12 can select from the reference views a limited number of views as basic views such that the selected basic views can express a visible range of a scene as much as possible. Pictures in the basic views may be transmitted as a complete picture. Further, redundant samples between remaining non-basic views and the basic views can be removed, that is, only valid information that is not repeated is retained. Then, the valid information is extracted as patches, and the patches are reorganized with the pictures in the basic views to form a larger rectangular image, where the rectangular image may also be referred to as an atlas or atlas image. The atlas image may be used to generate video data, where the video data may include texture video data and geometry video data. The video data may be used as an input image of the video encoding framework 13, and the output of the video encoding framework 13 may be used as an input to the video decoding framework 14.

Of course, there may also be auxiliary data related to patch stitching for the atlas image.

As illustrated in FIG. 1, the auxiliary data related to stitching information of the patch may also be signalled into a bitstream. As such, scene information can be retained as much as possible while a transmission sample rate is reduced, and thus sufficient information can be ensured for the post-processing module 15 to render a reconstructed picture to obtain a final viewport.

Figure 3:
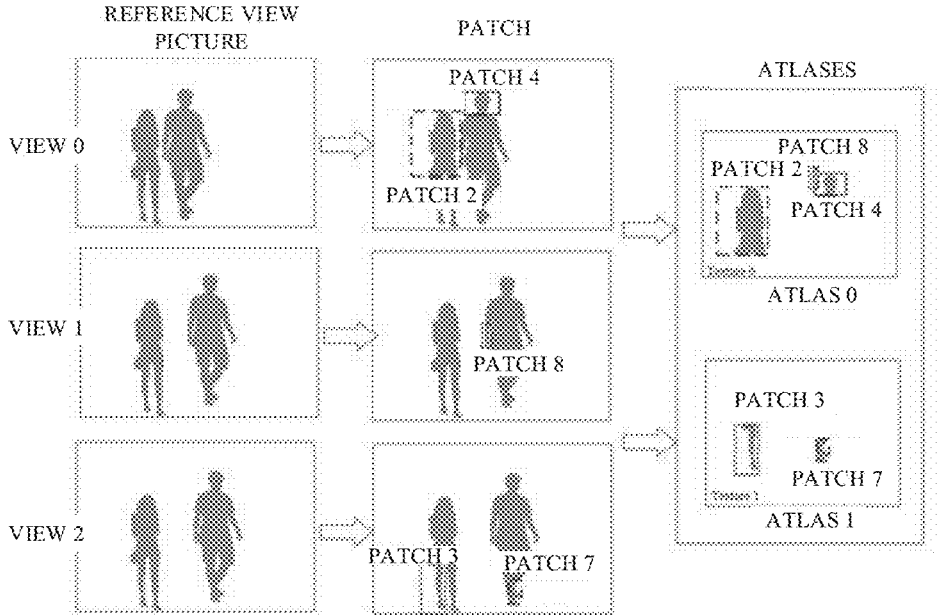
FIG. 3 is an example of a process of generating an atlas provided in embodiments of the disclosure.

FIG. 3 is an example of a process of generating an atlas provided in embodiments of the disclosure.

As illustrated in FIG. 3, reference views include view 0, view 1, and view 2. A reference view picture captured in view 0 may be used to extract patch 2 and patch 4, a reference view picture captured in view 1 may be used to extract patch 8, and a reference view picture captured in view 2 may be used to extract patch 3 and patch 7. Further, atlas 0 is obtained based on patch 2, patch 4, and patch 8, and atlas 1 is obtained based on patch 3 and patch 7. Atlas 0 and atlas 1 may be used as inputs to the video encoding framework 13.

The video encoding framework 13 is configured to encode and compress a video, and the video decoding framework 14 is configured to decode and reconstruct the video.

It may be noted that, the specific implementations of the video encoding framework 13 and the video decoding framework 14 are not limited in the disclosure. For example, a coding framework that applies three-dimension (3D) video coding technologies such as MV-HEVC and 3D-HEVC to a multi-view video can be used, and the coding efficiency of such a coding framework is higher than the coding efficiency of HEVC. However, with an increase in input reference views, MV-HEVC and 3D-HEVC lead to higher computation complexity despite the reduction in bandwidth loads. In addition, some devices may not support MV-HEVC and 3D-HEVC technologies. Therefore, a coding framework with traditional planar video hybrid coding technologies such as HEVC and VVC can also be used.

The post-processing module 15 is configured to synthesize and render a picture that is decoded in the video decoding framework 14, so as to obtain a final viewport. For example, a target viewport from a view of a user may be synthesized and rendered according to the decoded and reconstructed picture and the position and pose information of the user at the current moment.

For better understanding of the solutions of the disclosure, the following will give a brief introduction to the video encoding framework 13 and the video decoding framework 14.

Figure 4:
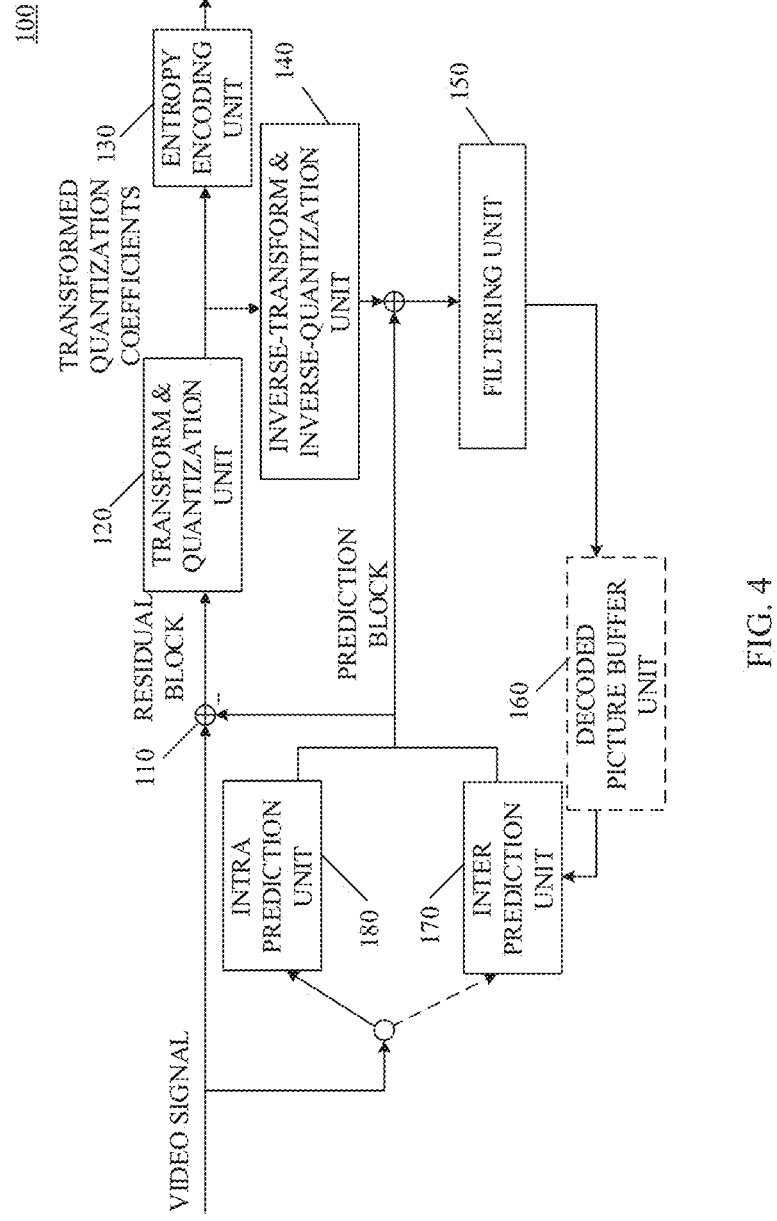
FIG. 4 is an example of a video encoding framework provided in embodiments of the disclosure.

FIG. 4 is a schematic block diagram of an encoding framework 100 provided in embodiments of the disclosure.

In the encoding framework 100, a residual block is obtained by calculating a residual between a prediction block and a to-be-encoded picture block, and the residual block is subject to processes including transform and quantization and then transmitted to a decoding end. The decoding end receives and parses the bitstream, obtains the residual block through operations including inverse transform and inverse quantization, and obtains a reconstructed block by adding the residual block and the prediction block predicted by the decoding end. As illustrated in FIG. 4, the encoding framework 100 may include an intra prediction unit 180, an inter prediction unit 170, a residual unit 110, a transform and quantization unit 120, an entropy encoding unit 130, an inverse-transform and inverse-quantization unit 140, and a loop filtering unit 150. Optionally, the encoding framework 100 may further include a decoded picture buffer unit 160. The encoding framework 100 may also be referred to as a hybrid framework coding mode.

The intra prediction unit 180 or the inter prediction unit 170 may predict a to-be-encoded picture block, so as to output the prediction block.

The intra prediction unit 180 may be used for intra prediction. In intra prediction, sample information of the to-be-encoded picture block is predicted by only referring to information of the same picture, so as to eliminate spatial redundancy. A frame for which intra prediction is used may be an I frame. For example, according to a coding order from left to right and from top to bottom, a top-left picture block, a top picture block, and a left picture block can be used as reference information for prediction of the to-be-encoded picture block, and the to-be-encoded picture block can be used as reference information of a next picture block. In this way, a whole picture can be predicted. If an input digital video is in a colour format such as a YUV 4:2:0 format, then every 4 pixels of each picture of the digital video have 4 Y components and 2 UV components, and the Y components (i.e., luma blocks) and the UV components (i.e., chroma blocks) may be encoded separately in the encoding frame-work 100. Similarly, the decoding end may also perform corresponding decoding according to a format.

Exemplarily, in intra prediction, an angular prediction mode and a non-angular prediction mode can be used to predict the to-be-encoded picture block, so as to obtain the prediction block. For example, an optimal prediction mode for the to-be-encoded picture block is selected according to rate-distortion information calculated based on the prediction block and the to-be-encoded picture block, and the prediction mode is transmitted through a bitstream to the decoding end. The decoding end parses out the prediction mode, predicts a prediction block of a target decoding block, and then obtains a reconstructed block by adding the prediction block and a time-domain residual block transmitted through the bitstream. The non-angular mode remains relatively stable and includes an average mode and a planar mode, and the angular mode increases with the evolution of digital video coding standards. Taking international digital video coding standard H series as an example, H.264/AVC standard only includes eight angular prediction modes and one non-angular prediction mode, and H.265/HEVC is extended to include 33 angular prediction modes and two non-angular prediction modes. In H.266/VVC, intra prediction modes are further extended, and for the luma block, there is a total of 67 traditional prediction modes and non-traditional prediction mode, i.e., a matrix weighted intra prediction (MIP) mode. The traditional prediction modes include a planar mode with mode number 0, a DC mode with mode number 1, and angular prediction modes with mode number 2 to mode number 66.

The inter prediction unit 170 may be used for inter prediction. The inter prediction can refer to picture information of different pictures. In inter prediction, motion estimation is used to search for motion vector information that best matches the to-be-encoded picture block, so as to eliminate temporal redundancy. A frame for which inter prediction is used may include a P frame and/or a B frame, where the P frame refers to a forward prediction frame, and the B frame refers to a bidirectional prediction frame.

The residual unit 110 may calculate a residual block based on the prediction block and the to-be-encoded picture block, i.e., a difference between the prediction block and the to-be-encoded picture block. The residual block can be transformed and quantized by the transform and quantization unit 120 to remove information that is not sensitive to human eyes, so as to eliminate visual redundancy. Optionally, the residual block before being transformed and quantized by the transform and quantization unit 120 may be called a time-domain residual block, and the time-domain residual block after being transformed and quantized by the transform and quantization unit 120 may be called a frequency residual block or a frequency-domain residual block.

After receiving transformed quantization coefficients output by the transform and quantization unit 120, the entropy encoding unit 130 may output a bitstream based on the transformed quantization coefficients. For example, the entropy encoding unit 130 can eliminate character redundancy according to a target context model and probability information of a binary bitstream. For example, the entropy encoding unit 130 may be used for context-based adaptive binary arithmetic entropy coding (CABAC). The entropy encoding unit 130 may also be referred to as a header-information coding unit.

It may be understood that in this disclosure, the to-be-encoded picture block may also be referred to as an original picture block or a target picture block, the prediction block may also be referred to as a prediction picture block or a picture prediction block and may also be referred to as a prediction signal or prediction information, and the reconstructed block may also be referred to as a reconstructed picture block or a picture reconstructed block and may also be referred to as a reconstructed signal or reconstructed information. In addition, for the encoding end, the to-be-encoded picture block may also be referred to as an encoding block or an encoding picture block, and for the decoding end, the to-be-encoded picture block may also be referred to as a decoding block or a decoding picture block. The to-be-encoded picture block may be a coding tree unit (CTU) or a coding unit (CU), which is not limited in the disclosure.

It may be noted that the inverse-transform and inverse-quantization unit 140, the loop filtering unit 150, and the decoded picture buffer unit 160 may be configured to form a decoder. The intra prediction unit 180 or the inter prediction unit 170 can predict the to-be-encoded picture block based on the existing reconstructed block, thereby ensuring that the encoding end and the decoding end have a consistent understanding of a reference picture. In other words, the encoder may copy a processing loop of the decoder and thus generate the same prediction as the decoding end. Specifically, the quantized transform coefficients are inversely transformed and inversely quantized by the inverse-transform and inverse-quantization unit 140 to copy an approximate residual block at the decoding end. The approximate residual block is added to the prediction block, and then passes through the loop filtering unit 150 to smoothly filter out blocking artifacts caused by block-based processing and quantization. A picture block output by the loop filtering unit 150 may be stored in the decoded picture buffer unit 160 for prediction of a subsequent picture.

It may be understood that, FIG. 4 is only an example of the disclosure and may not be construed as a limitation to the disclosure.

For example, the loop filtering unit 150 in the encoding framework 100 may include a deblocking filter (DBF), a sample adaptive offset (SAO) filter, and an adaptive loop filter (ALF). The DBF is configured for deblocking, and the SAO filter is configured to remove a ringing effect. In other embodiments of the disclosure, a neural network-based loop filtering algorithm may be used in the encoding framework 100 to improve the compression efficiency of a video. In other words, the encoding framework 100 may be a video coding hybrid framework based on a deep learning neural network. In an implementation, on the basis of the DBF and the SAO filter, a sample filtering result may be calculated according to the neural network-based algorithm. A network structure of the loop filtering unit 150 on a luma component may be the same as or different from a network structure of the loop filtering unit 150 on a chroma component. Considering that the luma component contains more visual information, the luma component may be used to guide the filtering of the chroma component, so as to improve the reconstruction quality of the chroma component.

Figure 5:
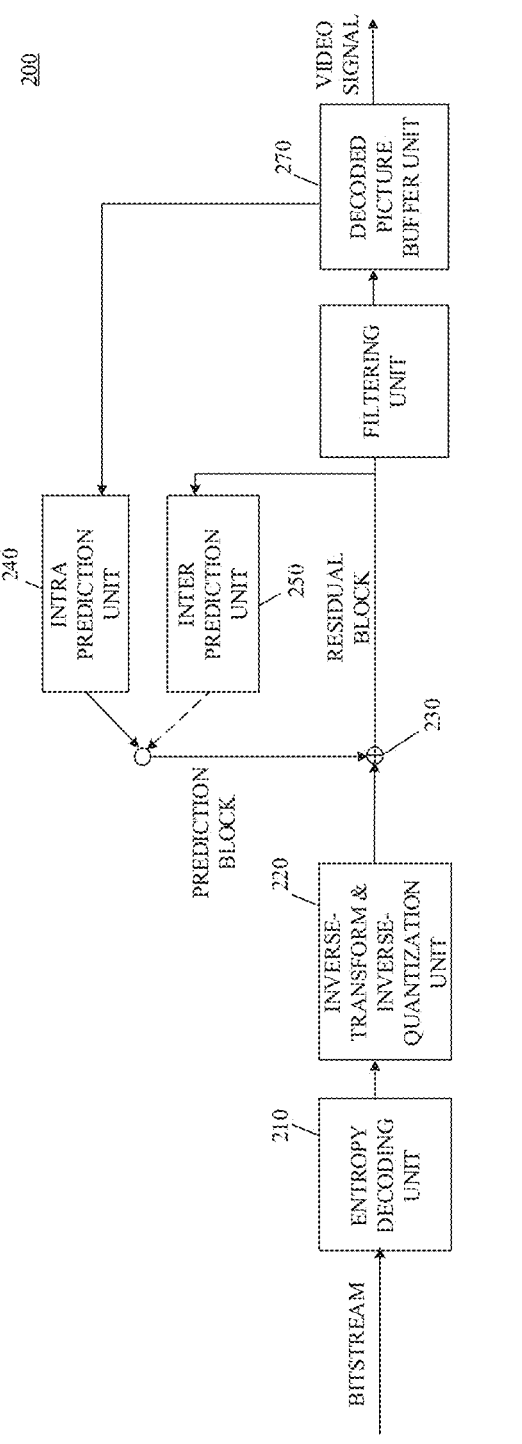
FIG. 5 is an example of a video decoding framework provided in embodiments of the disclosure.

FIG. 5 is a schematic block diagram of a decoding framework 200 provided in embodiments of the disclosure.

As illustrated in FIG. 5, the decoding framework 200 may include an entropy decoding unit 210, an inverse-transform and inverse-quantization unit 220, a residual unit 230, an intra prediction unit 240, an inter prediction unit 250, a loop filtering unit 260, and a decoded picture buffer unit 270.

The entropy decoding unit 210 receives and parses a bitstream to obtain a prediction block and a frequency-domain residual block. The frequency-domain residual block is inversely transformed and inversely quantized by the inverse-transform and inverse-quantization unit 220 to obtain a time-domain residual block. The residual unit 230 may obtain a reconstructed block by adding the prediction block predicted by the intra prediction unit 240 or the inter prediction unit 250 and the time-domain residual block inversely transformed and inversely quantized by the inverse-transform and inverse-quantization unit 220. For example, the intra prediction unit 240 or the inter prediction unit 250 may obtain the prediction block by decoding header information of the bitstream.

In the MIV decoding process, atlases may be converted from an atlas coordinate system to a 3D space coordinate system by using the same scaling factor, so as to obtain a 3D viewport from a view of a user. Each atlas may contain one or more patches, and each patch may be a patch in a certain view. Specifically, for all patches with a special view in the atlas, a scaling factor for these patches is obtained through calculation according to an atlas-level scaling parameter read from a bitstream. The scaling factor for each patch includes a width-scaling factor and a height-scaling factor. In addition, for patches with a normal view in the atlas, instead of reading a scaling factor from the bitstream, a default scaling factor can be used directly, for example, both a default width-scaling factor and a default height-scaling factor have a value of 1. That is to say, the same scaling factor is used for all the patches in the special view, and the constant default scaling factor is used for all the patches in the normal view.

Exemplarily, the decoding end may decode a patch in the following manner.

Step 1

An atlas-level inpaint flag asme_inpaint_enabled_flag is obtained from the bitstream, where asme_inpaint_enabled-_flag indicates whether to perform upsampling pixel inpainting on a corresponding atlas.

Step 2

An X-axis coordinate scaling parameter afme_inpaint-_lod_scale_x_minus1 and a Y-axis coordinate scaling parameter afme_inpaint_lod_scale_y_idc of the atlas are obtained from the bitstream.

Step 3

If the flag asme_inpaint_enabled_flag indicates YES, a patch-level inpaint flag pdu_inpaint_flag is obtained from the bitstream, where pdu_inpaint_flag indicates whether to perform upsampling pixel inpainting on a corresponding patch.

Step 4

If the flag pdu_inpaint_flag indicates YES, it indicates that a view corresponding to the corresponding patch is a special view. In this case, upsampling pixel inpainting may be performed on the corresponding patch by using Method 1 below. If the flag pdu_inpaint_flag indicates NO, it indicates that the view corresponding to the patch is a normal view. In this case, upsampling inpainting may be omitted for the corresponding patch by using Method 2.

Method 1

A width-scaling factor (TilePatchLoDScaleX[tileID][p]) is obtained according to afme_inpaint_lod_scale_x_minus1, and a height-scaling factor (TilePatchLoDScaleY[tileID] [p]) is obtained according to afme_inpaint_lod_scale_y_idc.

Method 2

The width-scaling factor and the height-scaling factor default to 1.

Step 5

After the width-scaling factor and the height-scaling factor are obtained, the position (x, y) of each patch in the special view is respectively expanded in width and height, so that 2D atlas coordinates (X, Y) of the patch can be converted into local 3D patch coordinates (u, v, D).

Step 6

After the local 3D patch coordinates of the patch are obtained, the coordinates are mapped to a 3D view space coordinate system according to different un-projection schemes.

For example, for patch P1 with patch index p1 of a tile with index tileID1 in an atlas, if a patch-level inpaint flag of P1 indicates YES, it indicates that a view corresponding to P1 is a special view. In this case, after obtaining afme_inpaint_lod_scale_x_minus1 and afme_inpaint_lod_scale_y_idc, the decoding end may obtain a width-scaling factor TilePatchLoDScaleX[tileID1][p1] and a height-scaling factor TilePatchLoDScaleY[tileID1][p1].

For another example, for patch P2 with patch index p2 of a tile with index tileID1 in the atlas, if a patch-level inpaint flag of P2 indicates YES, it indicates that a view corresponding to P2 is a special view. In this case, after obtaining afme_inpaint_lod_scale_x_minus1 and afme_inpaint_lod_scale_y_idc], the decoding end may obtain a width-scaling factor TilePatchLoDScaleX[tileID1][p2] the same as the width-scaling factor for P1 and a height-scaling factor TilePatchLoDScaleY[tileID1][p2] the same as the height-scaling factor for P1.

For another example, for patch P3 with patch index p1 of a tile with index tileID2 in the atlas, if a patch-level inpaint flag of P3 indicates YES, it indicates that a view corresponding to P3 is a special view. In this case, after obtaining afme_inpaint_lod_scale_x_minus1 and afme_inpaint_lod_scale_y_idc], the decoding end may obtain a width-scaling factor TilePatchLoDScaleX[tileID2][p1] the same as the width-scaling factor for P1 and a height-scaling factor TilePatchLoDScaleY[tileID2][p1] the same as the height-scaling factor for P1.

For another example, for patch P4 with patch index p3 of a tile with index tileID3 in the atlas, if a patch-level inpaint flag of P4 indicates NO, it indicates that a view corresponding to P4 is a normal view. In this case, a width-scaling factor TilePatchLoDScaleX[tileID3][p3] and a height-scaling factor TilePatchLoDScaleY[tileID3][p3] that have a default value of 1 may be obtained.

However, in the above solutions, in a case where the same scaling factor is used for all the patches in the special view, when different patches in the special view are of different importance, the patches parsed by the decoding end may fail to completely express information, which reduces the quality of a decoded picture. Similarly, in a case where the scaling factor for all the patches in the normal view defaults to 1, when a relatively important patch exists in the normal view, the patches parsed by the decoding end may fail to completely express information, which reduces the quality of the decoded picture.

In view of this, resolution-based decoding and encoding methods, a decoder, and an encoder are provided in embodiments of the disclosure, which can improve the quality of the decoded picture.

FIG. 6 is a schematic flowchart of a resolution-based decoding method 300 provided in embodiments of the disclosure.

As illustrated in FIG. 6, the decoding method 300 may include the following.

At S310, a decoding end parses a bitstream to obtain a current patch.

At S320, the decoding end determines whether the current patch is a patch whose resolution is to be changed.

At S330, when the current patch is a patch whose resolution is to be changed, the decoding end parses the bitstream to obtain a scaling-rate parameter of the current patch.

At S340, the decoding end determines a scaling factor for the current patch based on the scaling-rate parameter of the current patch.

At S350, the decoding end obtains coordinates of the current patch in a 3D space coordinate system based on the scaling factor for the current patch.

Exemplarily, the scaling-rate parameter of the current patch may include a width scaling-rate parameter pdu_sampling_rate_width[tileID][p] and a height scaling-rate parameter pdu_sampling_rate_height[tileID][p]. In the above, pdu_sampling_rate_width[tileID][p] represents a width scaling-rate parameter of a patch with patch index p of a tile with index tileID, and pdu_sampling_rate_height[tileID][p] represents a height scaling-rate parameter of the patch with patch index p of the tile with index tileID.

In this embodiment, when the current patch is a patch whose resolution is to be changed, a scaling-rate parameter of the current patch is signalled into the bitstream, that is, a patch-level scaling-rate parameter is signalled into the bitstream. In this way, different scaling parameters can be used for different patches in the same atlas, or different scaling parameters can be used for different patches in the same view, which can improve the expression of some important patches and thus improve the quality of a decoded picture.

From the perspective of the bitstream and picture quality, the decoding method provided in the disclosure can achieve the following technical effects.

1. The bitstream can be reduced without substantial change in the picture/video quality.

Specifically, in a case where a scaling factor for all patches in a normal view defaults to 1, when a relatively important patch exists in the normal view, the patches parsed by the decoding end may fail to completely express information, which reduces the quality of the decoded picture. In the disclosure, different scaling-rate parameters can be used for respective patches in the normal view, for example, relatively high scaling-rate parameters are used for some patches and relatively low scaling-rate parameters are used for other patches, so that a constant default scaling-rate parameter will not be used for all the patches in the normal view. Based on this, the bitstream for some patches with high scaling-rate parameters will be small while the overall quality will not be affected.

2. The decoding performance can be improved under the condition of a low bitrate.

Specifically, under the limitation of the low bitrate, when the constant default scaling-rate parameter is used for all normal views, the decoding end may fail to completely parse out expression information of important patches in some important views, so that the quality of the decoded picture is reduced. In the disclosure, a higher sampling rate can be used for some less important patches in some less important normal views to obtain a smaller bitstream, which is conducive to assigning more bitstreams to other patches and is thus conducive to achieving higher decoding performance.

3. When there are occluded areas, especially small occlusions in some views, performance can be improved.

Specifically, for small occlusions, a higher sampling rate may be used to obtain a smaller bitstream, which is conducive to assigning more bitstreams to other patches and is thus conducive to achieving higher decoding performance.

In some embodiments, operations at S320 may include the following. The bitstream is parsed to obtain a value of a first flag, where the value of the first flag being a first value indicates that the current patch is a patch whose resolution is to be changed, and the value of the first flag being a second value indicates that the current patch is a patch whose resolution is not to be changed.

Exemplarily, the first value is 0 and the second value is 1. Alternatively, the first value is 1 and the second value is 0.

Exemplarily, the first flag is a patch-level flag, which may be represented by pdu_scaled_flag.

Exemplarily, the decoding end parses the bitstream to obtain a value of pdu_scaled_flag. When the value of pdu_scaled_flag is 1, it indicates that the current patch is a patch whose resolution is to be changed. When the value of pdu_scaled_flag is 0, it indicates that the current patch is a patch whose resolution is not to be changed.

Exemplarily, the decoding end parses the bitstream to obtain pdu_scaled_flag of the current patch in the atlas. When the value of pdu_scaled_flag of the current patch is 1, the decoding end parses the bitstream to obtain the width scaling-rate parameter pdu_sampling_rate_width[tileID][p] and the height scaling-rate parameter pdu_sampling_rate_height[tileID][p] of the current patch.

Exemplarily, pdu_scaled_flag, pdu_sampling_rate_width[tileID][p], and pdu_sampling_rate_height[tileID][p] may be implemented as fields or elements in patch data unit MIV extension syntax. For example, the patch data unit MIV extension syntax may be implemented as syntax illustrated in Table 1.

TABLE 1

|  | Descriptor |
|---|---|
| pdu_miv_extension( tileID, p ) { | |
| ... | ... |
| if(asme_scaled_enabled_flag) | |
| pdu_scaled_flag[tileID][p] | u(1) |
| if(pdu_scaled_flag[tileID][p]){ | |
| pdu_sampling_rate_width[ tileID ][p] | u(v) |
| pdu_sampling_rate_height[tileID][p] | u(v) |
| } | |
| } | |

As illustrated in Table 1, when a value of asme_scaled_enabled_flag is 1, the decoding end parses the bitstream to obtain pdu_scaled_flag[tileID][p]. When a value of pdu_scaled_flag[tileID][p] is 1, the decoding end parses the bitstream to obtain the scaling-rate parameter of the current patch, i.e., the width scaling-rate parameter pdu_sampling_rate_width[tileID][p] and the height scaling-rate parameter pdu_sampling_rate_height[tileID][p] of the current patch. In the above, the value of pdu_scaled_flag[tileID][p] equal to 1 indicates that the current patch is a patch whose sampling rate is to be changed, and the value of pdu_scaled-_flag[tileID][p] equal to 0 indicates that the current patch is not a patch whose sampling rate is to be changed. When pdu_scaled_flag[tileID][p] is not present, the value of pdu_scaled_flag[tileID][p] shall be 0. In the above, pdu_sampling_rate_width[tileID][p] represents the width scaling-rate parameter of the patch with patch index p of the tile with index tileID, and pdu_sampling_rate_height[tileID][p] represents the height scaling-rate parameter of the patch with patch index p of the tile with index tileID.

In some embodiments, the operations at S320 may include the following. Whether a current atlas where the current patch is located contains patches with different resolutions is determined. When the current atlas contains patches with different resolutions, whether the current patch is a patch whose resolution is to be changed is determined.

In embodiments of the disclosure, before whether the current patch is a patch whose resolution is to be changed is determined, whether the current atlas where the current patch is located contains patches with different resolutions is determined. When the current atlas does not contain patches with different resolutions, that is, when the current atlas contains patches with the same resolution, the patch-level flag, i.e., the first flag, will not be introduced, which can improve coding performance.

In some embodiments, the bitstream is parsed to obtain a value of a second flag, where the value of the second flag being a third value indicates that the current atlas contains patches with different resolutions, and the value of the second flag being a fourth value indicates that the current atlas contains patches with a same resolution.

Exemplarily, the current atlas containing patches with different resolutions may mean that the current atlas contains at least two patches with different resolutions. The current atlas containing patches with the same resolution may mean that all patches contained in the current atlas have the same resolution.

Exemplarily, the third value is 0 and the fourth value is 1. Alternatively, the third value is 1 and the fourth value is 0.

Exemplarily, the second flag is an atlas-level flag, which may be represented by asme_scaled_enabled_flag.

Exemplarily, the bitstream is parsed to obtain a value of asme_scaled_enabled_flag. When the value of asme_scaled_enabled_flag is 1, it indicates that the current atlas contains patches with different resolutions. When the value of asme_scaled_enabled_flag is 0, it indicates that the current atlas contains patches with the same resolution.

Exemplarily, the decoding end parses the bitstream to obtain asme_scaled_enabled_flag of the current atlas. When the value of asme_scaled_enabled_flag of the current atlas is 1, the decoding end parses the bitstream to obtain pdu_scaled_flag of the current patch in the atlas. When the value of pdu_scaled_flag of the current patch is 1, the decoding end parses the bitstream to obtain the scaling-rate parameter of the current patch, for example, the width scaling-rate parameter pdu_sampling_rate_width[tileID][p] and the height scaling-rate parameter pdu_sampling_rate_height[tileID][p].

Exemplarily, the value of asme_scaled_enabled_flag may be carried in fields or elements in atlas sequence parameter set MIV extension syntax.

Exemplarily, the atlas sequence parameter set MIV extension syntax may be implemented as syntax illustrated in Table 2.

TABLE 2

|  | Descriptor |
| --- | --- |
| asps_miv_extension( ) { |  |
| ... | ... |
| asme_scaled_enabled_flag | u(1) |
| } |  |

As illustrated in Table 2, the atlas-level flag asme_scaled_enabled_flag may be carried in the asps_miv_extension( ) syntax structure. The value of asme_scaled_enabled_flag equal to 1 indicates that pdu_sampling_rate_width and pdu_sampling_rate_height are present in the patch_data_unit( ) syntax structure. The value of asme_scaled_enabled_flag equal to 0 indicates that pdu_sampling_rate_width and pdu_sampling_rate_height are not present in the patch_data_unit( ) syntax structure.

In some embodiments, the operations at S320 may include the following. Whether a current view where the current patch is located contains patches with different resolutions is determined. When the current view contains patches with different resolutions, whether the current patch is a patch whose resolution is to be changed is determined.

In embodiments of the disclosure, before whether the current patch is a patch whose resolution is to be changed is determined, whether the current view where the current patch is located contains patches with different resolutions is determined. When the current view does not contain patches with different resolutions, that is, when the current view contains patches with the same resolution, the patch-level flag, i.e., the first flag, will not be introduced, which can improve coding performance.

In some embodiments, the bitstream is parsed to obtain a value of a third flag, where the value of the third flag being a fifth value indicates that the current view contains patches with different resolutions, and the value of the third flag being a sixth value indicates that the current view contains patches with a same resolution.

Exemplarily, the current view containing patches with different resolutions may mean that the current view contains at least two patches with different resolutions. The current view containing patches with the same resolution may mean that all patches contained in the current view have the same resolution.

Exemplarily, the fifth value is 0 and the sixth value is 1. Alternatively, the fifth value is 1 and the sixth value is 0.

Exemplarily, the third flag is a view-level flag, which may be represented by mvp_view_wise_enabled_flag[viewID].

Exemplarily, the decoding end parses the bitstream to obtain a value of mvp_view_wise_enabled_flag[viewID]. When the value of mvp_view_wise_enabled_flag[viewID] is 1, it indicates that the current view contains patches with different resolutions. When the value of mvp_view_wise_enabled_flag[viewID] is 0, it indicates that the current view contains patches with the same resolution.

Exemplarily, the value of mvp_view_wise_enabled_flag[viewID] may be carried in fields or elements in MIV view parameters list syntax.

Exemplarily, the MIV view parameters list syntax may be implemented as syntax illustrated in Table 3.

TABLE 3

|  | Descriptor |
|---|---|
| miv_view_params_list( ) { | |
| ... | ... |
| mvp_pruning_graph_params_present_flag | u(1) |
| if ( mvp_pruning_graph_params_present_flag ) | |
| ... | ... |
| for( v = 0; v <= mvp_num_views_minus1; v++ ) { | |
| viewID = ViewIndexToID[ v ] | |
| mvp_view_wise_enabled_flag[viewID ] | u(1) |
| } | |
| } | |

As illustrated in Table 3, mvp_view_wise_enabled_flag [viewID] may be carried in the miv_view_params_list( ) syntax structure. The value of mvp_view_wise_enabled_flag[viewID] equal to 1 indicates that a view with index viewID is a view in which resolutions of patches may vary, and the value of mvp_view_wise_enabled_flag [viewID] equal to 0 indicates that the view with index viewID is a view in which resolutions of all patches remain unchanged. When not present, the value of mvp_view_wi-se_enabled_flag [viewID] shall be 0. Exemplarily, flags of (mvp_num_views_minus1+1) views can form one one-dimension (1D) array, which can be defined by IDs of the views as: mvp_view_wise_enabled_flag[viewID].

In some embodiments, operations at S340 may include the following. The scaling-rate parameter of the current patch is determined as the scaling factor for the current patch.

It may be understood that, this disclosure does not limit an existence form of the scaling-rate parameter of the current patch in the bitstream. For example, the decoding end may parse the bitstream to directly obtain the scaling-rate parameter of the current patch, that is, the decoding end may determine the parameter parsed from the bitstream as the scaling factor for the current patch. For another example, the decoding end may parse the bitstream to obtain an index and determine a scaling-rate parameter corresponding to the index as the scaling-rate parameter of the current patch, that is, the decoding end may determine the scaling factor for the current patch as the scaling-rate parameter corresponding to the index parsed from the bitstream.

In some embodiments, the method 300 may further include the following. When the current patch is a patch whose resolution is not to be changed, the scaling-rate parameter of the current patch is determined as a default value.

In some embodiments, first coordinates of the current patch in a 2D atlas coordinate system are obtained. Second coordinates of the current patch in a 3D patch coordinate system are obtained based on the first coordinates and the scaling factor. The coordinates of the current patch in the 3D space coordinate system are obtained by un-projecting the second coordinates to the 3D space coordinate system.

Exemplarily, after obtaining the second coordinates, the decoding end may finally obtain the coordinates of the current patch in the 3D space coordinate system by un-projecting the second coordinates to the 3D space coordinate system based on texture information or depth information of the current patch. Optionally, the depth information may be a depth map. Optionally, a sample value of the depth map may reflect a distance metric from a corresponding point to a capturing device, that is, the depth map may represent geometry information on a visible surface of the current patch.

Exemplarily, the 3D patch coordinate system may also be understood as a 2D coordinate system where the current atlas is located, such as a tangent (U) bi-tangent (V) coordinate system or a tangent (U), bi-tangent (V), and normal (D) coordinate system. The second coordinates are (U, V, 1).

Exemplarily, the 3D space coordinate system may be a 3D coordinate system where a target view is located, such as 3D Cartesian coordinates (x, y, z).

It may be understood that, embodiments of the disclosure do not limit the specific implementations of un-projecting the second coordinates to the 3D space coordinate system. For example, it may be implemented by the coordinate un-projection process defined by the standard Annex H2.4, that is, projected coordinates (U, V, D) in a local 3D space are un-projected to real 3D Cartesian coordinates (x, y, z). Exemplarily, an un-projection operation involved in the disclosure includes, but is not limited to, an ERP un-projection operation, a perspective un-projection operation, and an orthographic un-projection operation. Optionally, for the ERP un-projection operation, reference can be made to the description of the standard Annex H2.4.1, for the perspective un-projection operation, reference can be made to the description of the standard Annex H2.4.2, and for the orthographic un-projection operation, reference can be made to the description of the standard Annex H2.4.3, which will not be repeated herein.

In some embodiments, the second coordinates are obtained by projecting the current patch to the 3D patch coordinate system based on the first coordinates, the scaling factor, and a transform parameter. The transform parameter includes a transform process for characterizing a swap operation and/or a transform process for characterizing an invert operation.

Exemplarily, the swap operation may be a mirror swap operation along a U-axis or V-axis, the invert operation may be an invert operation along the U-axis or V-axis, and the like. For example, the invert operation may be a 90-degree invert operation along the U-axis or V-axis, etc.

In some embodiments, when the scaling-rate parameter of the current patch includes a width scaling-rate parameter, the scaling factor for the current patch includes a width-scaling factor corresponding to the width scaling-rate parameter; and/or when the scaling-rate parameter of the current patch includes a height scaling-rate parameter, the scaling factor for the current patch includes a height-scaling factor corresponding to the height scaling-rate parameter.

Figure 7:
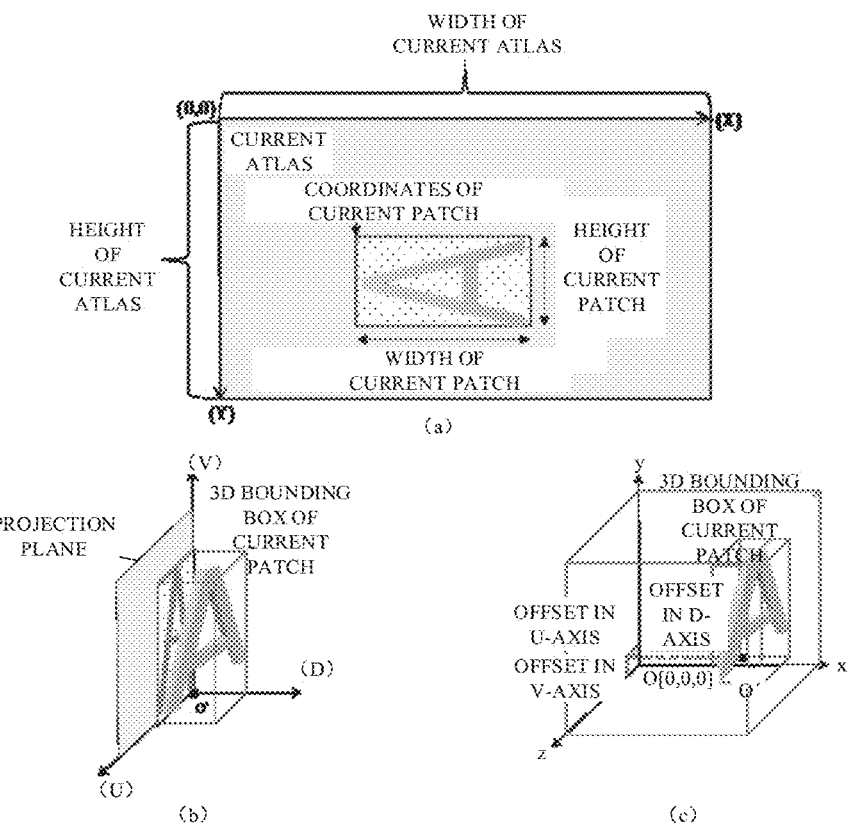
FIG. 7 is an example illustrating obtaining coordinates of a current patch in a three-dimension (3D) space coordinate system based on a scaling factor for the current patch provided in embodiments of the disclosure.

FIG. 7 is an example illustrating obtaining coordinates of a current patch in a 3D space coordinate system based on a scaling factor for the current patch provided in embodiments of the disclosure.

As illustrated in (a) of FIG. 7, after obtaining the width-scaling factor and the height-scaling factor for the current patch, the decoder may obtain a 2D atlas width coordinate and height coordinate of the current patch in the 2D atlas coordinate system. As illustrated in (b) of FIG. 7, the decoder may transform the 2D atlas width coordinate and height coordinate of the current patch in the 2D atlas coordinate system to obtain top-left coordinates (with the origin as a starting point) of the current patch in the 3D patch coordinate system (also referred to as a local patch coordinate system). For example, the 3D patch coordinate system may be a coordinate system where a projection plane is located. As illustrated in (c) of FIG. 7, after obtaining the top-left coordinates of the current patch in the 3D patch coordinate system, the decoder may obtain final coordinates of the current patch in the 3D patch coordinate system by multiplying the coordinates of the current patch in the 3D patch coordinate system by their respective scaling factors. If the swap operation exists, the obtained final coordinates need to be swapped. If the invert operation exists, the obtained final coordinates need to be subtracted from the rightmost coordinates (coordinates farthest from the origin) of the current patch in the 3D patch coordinate system.

Exemplarily, coordinates (x, y) of the current patch in the 2D atlas coordinate system may be converted into coordinates (1, u, v) of the current patch in the 3D patch coordinate system according to the following formula.

$$\begin{bmatrix} u \\ v \end{bmatrix} = R_o(oIdx) * \begin{bmatrix} lodX & 0 \\ 0 & lodY \end{bmatrix} * \begin{bmatrix} x-posX \\ y-posY \end{bmatrix} +$$
$$R_s(oIdx) * \begin{bmatrix} lodX & 0 \\ 0 & lodY \end{bmatrix} * \begin{bmatrix} sizeX-1 \\ sizeY-1 \end{bmatrix}$$

In the above, $R_o$ (swap) and $R_s$ (invert) respectively represent a swap process and an invert process, lodX and lodY respectively represent a width scaling factor and a height scaling factor, posX and poxY respectively represent a width position and a height position of the current patch in the current atlas, and sizeX and sizeY respectively represent a width and a height of the current patch.

Figure 8:
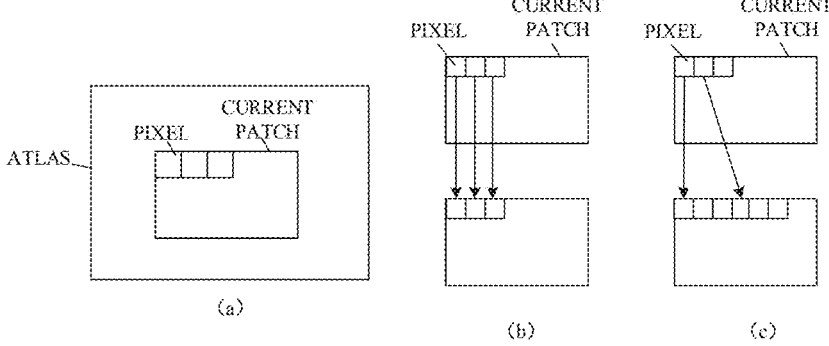
FIG. 8 is an example illustrating projecting a current patch from a two-dimension (2D) atlas coordinate system to a 3D patch coordinate system provided in embodiments of the disclosure.

FIG. 8 is an example illustrating projecting a current patch from a 2D atlas coordinate system to a 3D patch coordinate system provided in embodiments of the disclosure.

As illustrated in (a) of FIG. 8, the current patch in the atlas may contain multiple pixels. The projection process in (b) of FIG. 7 with a scaling factor of 1 is illustrated in (b) of FIG. 8, and the projection process in (b) of FIG. 7 with a scaling factor other than 1 is illustrated in (c) of FIG. 8. If a resolution of the current patch is consistent with a resolution of the view, as illustrated in (b) of FIG. 8, one pixel of the current patch in the 2D atlas coordinate system may correspond to or be projected to one pixel in the 3D patch coordinate system, so that pixels in the 3D patch coordinate system have continuity. If the resolution of the current patch is inconsistent with the resolution of the view, as illustrated in (c) of FIG. 8, one pixel of the current patch in the 2D atlas coordinate system may correspond to or be projected to multiple pixels in the 3D patch coordinate system. That is, an upsampling operation may be performed on a pixel of the current patch in the 2D atlas coordinate system, so as to ensure continuity of the pixels in the 3D patch coordinate system.

The solutions of the disclosure will be described below in combination with specific embodiments.

Embodiment 1

In this embodiment, the decoding end may execute part or all of the following operations.

Step 1

An atlas-level flag asme_scaled_enabled_flag is obtained from the bitstream, where asme_scaled_enabled_flag indicates whether a current atlas where the current patch is located contains patches with different resolutions.

Step 2

If the flag asme_scaled_enabled_flag indicates YES, the decoding end may obtain from the bitstream pdu_scaled- _flag of the current patch, where pdu_scaled_flag indicates whether the current patch is a patch whose resolution is to be changed.

Step 3

If pdu_scaled_flag indicates YES, the decoding end may obtain from the bitstream a scaling-rate parameter of the current patch, i.e., a width scaling-rate parameter pdu_sampling_rate_width[tileID][p] and a height scaling-rate parameter pdu_sampling_rate_height[tileID][p].

Step 4

If both asme_scaled_enabled_flag and pdu_scaled_flag indicate YES, the decoding end may determine a scaling factor for the current patch (with indexes tileID and p) by using Method 1 below. If asme_scaled_enabled_flag or pdu_scaled_flag indicates NO, the decoding end may determine the scaling factor for the current patch (with indexes tileID and p) by using Method 2 below.

Method 1

The decoding end may obtain a width-scaling factor TilePatchLoDScaleX[tileID][p] for the current patch according to the width scaling-rate parameter pdu_sampling_rate_width[tileID][p], and obtain a height-scaling factor TilePatchLoDScaleY[tileID][p] for the current patch according to the height scaling-rate parameter pdu_sampling_rate_height[tileID][p].

Method 2

The decoding end may determine that the width-scaling factor and the height-scaling factor for the current patch default to 1.

Step 5

After obtaining the width-scaling factor and the height-scaling factor for the current patch by using Method 1 or Method 2, the decoding end may transform the 2D atlas width coordinate and height coordinate of the current patch in the 2D atlas coordinate system to obtain top-left coordinates (with the origin as a starting point) of the current patch in the 3D patch coordinate system (also referred to as a local patch coordinate system). Then, the decoding end obtains final coordinates of the current patch in the 3D patch coordinate system by multiplying the coordinates of the current patch in the 3D patch coordinate system by their respective scaling factors. If the swap operation exists, the obtained final coordinates need to be swapped. If the invert operation exists, the obtained final coordinates need to be subtracted from the rightmost coordinates (coordinates farthest from the origin) of the current patch in the 3D patch coordinate system.

Exemplarily, coordinates (x, y) of the current patch in the 2D atlas coordinate system may be converted into coordinates (1, u, v) of the current patch in the 3D patch coordinate system according to the following formula.

$$\begin{bmatrix} u \\ v \end{bmatrix} = R_o(oIdx) * \begin{bmatrix} lodX & 0 \\ 0 & lodY \end{bmatrix} * \begin{bmatrix} x-posX \\ y-posY \end{bmatrix} +$$

-continued $$R_s(oIdx) * \begin{bmatrix} lodX & 0 \\ 0 & lodY \end{bmatrix} * \begin{bmatrix} sizeX-1 \\ sizeY-1 \end{bmatrix}$$

In the above, $R_o$ (swap) and $R_s$ (invert) respectively represent a swap process and an invert process, lodX and lodY respectively represent a width scaling factor and a height scaling factor, posX and poxY respectively represent a width position and a height position of the current patch in the current atlas, and sizeX and sizeY respectively represent a width and a height of the current patch.

Step 6

After the local 3D patch coordinates of the current patch are obtained, the coordinates are mapped to a 3D view space coordinate system according to different un-projection schemes (see Annex H2.4 for specific schemes). Exemplarily, an un-projection operation involved in the disclosure includes, but is not limited to, an ERP un-projection operation, a perspective un-projection operation, and an orthographic un-projection operation. Optionally, for the ERP un-projection operation, reference can be made to the description of the standard Annex H2.4.1, for the perspective un-projection operation, reference can be made to the description of the standard Annex H2.4.2, and for the orthographic un-projection operation, reference can be made to the description of the standard Annex H2.4.3, which will not be repeated herein.

Example 1

Assuming that the current patch is patch P1 with patch index p1 of a tile with index tileID1 in an atlas, an index of the view is viewID1, and pdu_scaled_flag indicates YES, after obtaining a scaling-rate parameter of the patch P1, namely a width scaling-rate parameter pdu_sampling_rate_width[tileID1][p1] and a height scaling-rate parameter pdu_sampling_rate_height[tileID1][p1] of the patch P1, the decoding end may obtain a width-scaling factor lodX=TilePatchLoDScaleX[tileID1][p1] and a height-scaling factor lodY=TilePatchLoDScaleY[tileID1][p1] for the patch P1 based on the scaling-rate parameter.

Further, assuming that the decoding end determines that no transform operation is needed for the patch P1, then $$R_o = \begin{bmatrix} 1 & 0 \\ 0 & 1 \end{bmatrix} \text{ and } R_s = \begin{bmatrix} 0 & 0 \\ 0 & 0 \end{bmatrix}.$$

Based on this, final local 3D patch coordinates (1, u, v) can be obtained according to the following formula.

$$\begin{bmatrix} u \\ v \end{bmatrix} = \begin{bmatrix} 1 & 0 \\ 0 & 1 \end{bmatrix} * \begin{bmatrix} lodX & 0 \\ 0 & lodY \end{bmatrix} * \begin{bmatrix} x - posX \\ y - posY \end{bmatrix}$$

Further, assuming that the decoder determines that the perspective un-projection operation is needed for P1, then final 3D space coordinates, i.e., (sampleX, sampleY, sampleZ), can be obtained according to the method in Annex H2.4.2.

Example 2

Assuming that the current patch is patch P2 with patch index p2 of a tile with index tileID1 in the atlas, an index of the view is viewID1, and pdu_scaled_flag indicates YES, after obtaining a scaling-rate parameter of the patch P2, namely a width scaling-rate parameter pdu_sampling_rate_width[tileID1][p2] and a height scaling-rate parameter pdu_sampling_rate_height[tileID1][p2] of the patch P2, the decoding end may obtain a width-scaling factor lodX=TilePatchLoDScaleX[tileID1][p2] and a height-scaling factor lodY=TilePatchLoDScaleY[tileID1][p2] for the patch P2 based on the scaling-rate parameter.

Further, assuming that the decoding end determines that a transform operation of swapping is needed for the patch P2, then $$R_o = \begin{bmatrix} 0 & 1 \\ 1 & 0 \end{bmatrix} \text{ and } R_s = \begin{bmatrix} 0 & 0 \\ 0 & 0 \end{bmatrix}.$$

Based on this, final local 3D patch coordinates (1, u, v) can be obtained according to the following formula.

$$\begin{bmatrix} u \\ v \end{bmatrix} = \begin{bmatrix} 0 & 1 \\ 1 & 0 \end{bmatrix} * \begin{bmatrix} lodX & 0 \\ 0 & lodY \end{bmatrix} * \begin{bmatrix} x - posX \\ y - posY \end{bmatrix}$$

Further, assuming that the decoder determines that the perspective un-projection operation is needed for P2, then final 3D space coordinates, i.e., (sampleX, sampleY, sampleZ), can be obtained according to the method in Annex H2.4.2.

Example 3

Assuming that the current patch is patch P3 with patch index p1 of a tile with index tileID2 in the atlas, an index of the view is viewID1, and pdu_scaled_flag indicates NO, a width-scaling factor lodX=TilePatchLoDScaleX[tileID2][p1] and a height-scaling factor lodY=TilePatchLoDScaleY[tileID2][p1] that have a default value of 1 may be obtained.

Further, assuming that the decoding end determines that a transform operation of height inverting is needed for the patch P3, then $$R_o = \begin{bmatrix} 1 & 0 \\ 0 & -1 \end{bmatrix} \text{ and } R_s = \begin{bmatrix} 0 & 0 \\ 0 & 1 \end{bmatrix}.$$

Based on this, final local 3D patch coordinates (1, u, v) can be obtained according to the following formula.

$$\begin{bmatrix} u \\ v \end{bmatrix} = \begin{bmatrix} 1 & 0 \\ 0 & -1 \end{bmatrix} * \begin{bmatrix} 1 & 0 \\ 0 & 1 \end{bmatrix} * \begin{bmatrix} x - posX \\ y - posY \end{bmatrix} + \begin{bmatrix} 0 & 0 \\ 0 & 1 \end{bmatrix} * \begin{bmatrix} 1 & 0 \\ 0 & 1 \end{bmatrix} * \begin{bmatrix} sizeX - 1 \\ sizeY - 1 \end{bmatrix}$$

Further, assuming that the decoder determines that the orthographic un-projection operation is needed for P3, then final 3D space coordinates, i.e., (sampleX, sampleY, sampleZ), can be obtained according to the method in Annex H2.4.3.

Example 4

Assuming that the current patch is patch P4 with patch index p2 of a tile with index tileID2 in the atlas, an index of the view is viewID1, and pdu_scaled_flag indicates YES, after obtaining a scaling-rate parameter of the patch P4, namely a width scaling-rate parameter pdu_sampling_rate_width[tileID2][p2] and a height scaling-rate parameter pdu_sampling_rate_height[tileID2][p2] of the patch P4, the decoding end may obtain a width-scaling factor lodX=TilePatchLoDScaleX[tileID2][p2] and a height-scaling factor lodY=TilePatchLoDScaleY[tileID2][p2] for the patch P4 based on the scaling-rate parameter.

Further, assuming that the decoding end determines that a transform operation of width inverting is needed for the patch P4, then $$R_o = \begin{bmatrix} -1 & 0 \\ 0 & 1 \end{bmatrix} \text{ and } R_s = \begin{bmatrix} 1 & 0 \\ 0 & 0 \end{bmatrix}.$$

Based on this, final local 3D patch coordinates (1, u, v) can be obtained according to the following formula.

$$\begin{bmatrix} u \\ v \end{bmatrix} = \begin{bmatrix} -1 & 0 \\ 0 & 1 \end{bmatrix} * \begin{bmatrix} lodX & 0 \\ 0 & lodY \end{bmatrix} * \begin{bmatrix} x - posX \\ y - posY \end{bmatrix} +$$
$$\begin{bmatrix} 1 & 0 \\ 0 & 0 \end{bmatrix} * \begin{bmatrix} lodX & 0 \\ 0 & lodY \end{bmatrix} * \begin{bmatrix} sizeX - 1 \\ sizeY - 1 \end{bmatrix}$$

Further, assuming that the decoder determines that the orthographic un-projection operation is needed for P3, then final 3D space coordinates, i.e., (sampleX, sampleY, sampleZ), can be obtained according to the method in Annex H2.4.3.

Example 5

Assuming that the current patch is patch P5 with patch index p3 of a tile with index tileID2 in the atlas, an index of the view is viewID2, and pdu_scaled_flag indicates YES, after obtaining a scaling-rate parameter of the patch P5, namely a width scaling-rate parameter pdu_sampling_rate_width[tileID2][p3] and a height scaling-rate parameter pdu_sampling_rate_height[tileID2][p3] of the patch P5, the decoding end may obtain a width-scaling factor lodX=TilePatchLoDScaleX[tileID2][p3] and a height-scaling factor lodY=TilePatchLoDScaleY[tileID2][p3] for the patch P5 based on the scaling-rate parameter.

Further, assuming that the decoding end determines that transform operations of width inverting and swapping are needed for the patch P5, then $$R_o = \begin{bmatrix} 0 & 1 \\ -1 & 0 \end{bmatrix} \text{ and } R_s = \begin{bmatrix} 0 & 0 \\ 1 & 0 \end{bmatrix}.$$

Based on this, final local 3D patch coordinates (1, u, v) can be obtained according to the following formula.

$$\begin{bmatrix} u \\ v \end{bmatrix} = \begin{bmatrix} 0 & 1 \\ -1 & 0 \end{bmatrix} * \begin{bmatrix} lodX & 0 \\ 0 & lodY \end{bmatrix} * \begin{bmatrix} x - posX \\ y - posY \end{bmatrix} +$$
$$\begin{bmatrix} 0 & 0 \\ 1 & 0 \end{bmatrix} * \begin{bmatrix} lodX & 0 \\ 0 & lodY \end{bmatrix} * \begin{bmatrix} sizeX - 1 \\ sizeY - 1 \end{bmatrix}$$

Further, assuming that the decoding end determines that the ERP un-projection operation is needed for P5, then final 3D space coordinates, i.e., (sampleX, sampleY, sampleZ), can be obtained according to the method in Annex H2.4.1.

Example 6

Assuming that the current patch is patch P6 with patch index p1 of a tile with index tileID3 in the atlas, an index of the view is viewID2, and pdu_scaled_flag indicates NO, a width-scaling factor lodX=TilePatchLoDScaleX[tileID3][p1] and a height-scaling factor lodY=TilePatchLoDScaleY[tileID3][p1] that have a default value of 1 may be obtained.

Further, assuming that the decoding end determines that transform operations of height inverting and swapping are needed for the patch P6, then $$R_o = \begin{bmatrix} 0 & -1 \\ 1 & 0 \end{bmatrix} \text{ and } R_s = \begin{bmatrix} 0 & 1 \\ 0 & 0 \end{bmatrix}.$$

Based on this, final local 3D patch coordinates (1, u, v) can be obtained according to the following formula.

$$\begin{bmatrix} u \\ v \end{bmatrix} = \begin{bmatrix} 0 & -1 \\ 1 & 0 \end{bmatrix} * \begin{bmatrix} 1 & 0 \\ 0 & 1 \end{bmatrix} * \begin{bmatrix} x - posX \\ y - posY \end{bmatrix} + \begin{bmatrix} 0 & 1 \\ 0 & 0 \end{bmatrix} * \begin{bmatrix} 1 & 0 \\ 0 & 1 \end{bmatrix} * \begin{bmatrix} sizeX - 1 \\ sizeY - 1 \end{bmatrix}$$

Further, assuming that the decoding end determines that the ERP un-projection operation is needed for P6, then final 3D space coordinates, i.e., (sampleX, sampleY, sampleZ), can be obtained according to the method in Annex H2.4.1.

Example 7

Assuming that the current patch is patch P7 with patch index p2 of a tile with index tileID3 in the atlas, an index of the view is viewID3, and pdu_scaled_flag indicates NO, a width-scaling factor lodX=TilePatchLoDScaleX[tileID3][p2] and a height-scaling factor lodY=TilePatchLoDScaleY[tileID3][p2] that have a default value of 1 may be obtained.

Further, assuming that the decoding end determines that transform operations of width inverting, height inverting, and swapping are needed for the patch P7, then $$R_o = \begin{bmatrix} 0 & -1 \\ -1 & 0 \end{bmatrix} \text{ and } R_s = \begin{bmatrix} 0 & 1 \\ 1 & 0 \end{bmatrix}.$$

Based on this, final local 3D patch coordinates (1, u, v) can be obtained according to the following formula.

$$\begin{bmatrix} u \\ v \end{bmatrix} = \begin{bmatrix} 0 & -1 \\ -1 & 0 \end{bmatrix} * \begin{bmatrix} 1 & 0 \\ 0 & 1 \end{bmatrix} * \begin{bmatrix} x - posX \\ y - posY \end{bmatrix} + \begin{bmatrix} 0 & 1 \\ 1 & 0 \end{bmatrix} * \begin{bmatrix} 1 & 0 \\ 0 & 1 \end{bmatrix} * \begin{bmatrix} sizeX - 1 \\ sizeY - 1 \end{bmatrix}$$

Further, assuming that the decoding end determines that the orthographic un-projection operation is needed for P7, then final 3D space coordinates, i.e., (sampleX, sampleY, sampleZ), can be obtained according to the method in Annex H2.4.3.

Example 8

Assuming that the current patch is patch P8 with patch index p3 of a tile with index tileID4 in the atlas, an index of the view is viewID3, and pdu_scaled_flag indicates YES, after obtaining a scaling-rate parameter of the patch P8, namely a width scaling-rate parameter pdu_sampling_rate_width[tileID4][p3] and a height scaling-rate parameter pdu_sampling_rate_height[tileID4][p3] of the patch P8, the decoding end may obtain a width-scaling factor lodX=TilePatchLoDScaleX[tileID4][p3] and a height-scaling factor lodY=TilePatchLoDScaleY[tileID4][p3] for the patch P8 based on the scaling-rate parameter.

Further, assuming that the decoding end determines that transform operations of width inverting and height inverting are needed for the patch P8, then $$R_o = \begin{bmatrix} -1 & 0 \\ 0 & -1 \end{bmatrix} \text{ and } R_s = \begin{bmatrix} 1 & 0 \\ 0 & 1 \end{bmatrix}.$$

Based on this, final local 3D patch coordinates (1, u, v) can be obtained according to the following formula.

$$\begin{bmatrix} u \\ v \end{bmatrix} = \begin{bmatrix} -1 & 0 \\ 0 & -1 \end{bmatrix} * \begin{bmatrix} lodX & 0 \\ 0 & lodY \end{bmatrix} * \begin{bmatrix} x - posX \\ y - posY \end{bmatrix} + \begin{bmatrix} 1 & 0 \\ 0 & 1 \end{bmatrix} * \begin{bmatrix} lodX & 0 \\ 0 & lodY \end{bmatrix} * \begin{bmatrix} sizeX - 1 \\ sizeY - 1 \end{bmatrix}$$

Further, assuming that the decoding end determines that the ERP un-projection operation is needed for P8, then final 3D space coordinates, i.e., (sampleX, sampleY, sampleZ), can be obtained according to the method in Annex H2.4.1.

It may be noted that, the above embodiments are only examples of the disclosure and may not be construed as limitations to the disclosure.

Preferable implementations of the disclosure have been described in detail above with reference to the accompanying drawings. However, the disclosure is not limited to the details described in the foregoing implementations. Within the scope of the technical concept of the disclosure, various simple modifications can be made to the technical solutions of the disclosure, and these simple modifications all fall within the protection scope of the disclosure. For example, various technical features described in the foregoing implementations may be combined in any suitable manner without contradiction, and in order to avoid unnecessary redundancy, various possible combinations are not further described in the disclosure. For another example, various implementations of the disclosure may also be combined in any manner, and as long as the combinations do not depart from the idea of the disclosure, they should also be considered as contents disclosed in the disclosure.

It may also be understood that, in various method embodiments of the disclosure, the magnitude of a sequence number of each of the foregoing processes does not mean an execution order, and an execution order of each process may be determined according to a function and an internal logic of the process, which may not constitute any limitation to an implementation process of embodiments of the disclosure.

The decoding method of embodiments of the disclosure has been described in detail above from the perspective of the decoding end with reference to FIG. 6 to FIG. 8. The encoding method of embodiments of the disclosure will be described below from the perspective of the encoding end with reference to FIG. 9.

Figure 9:
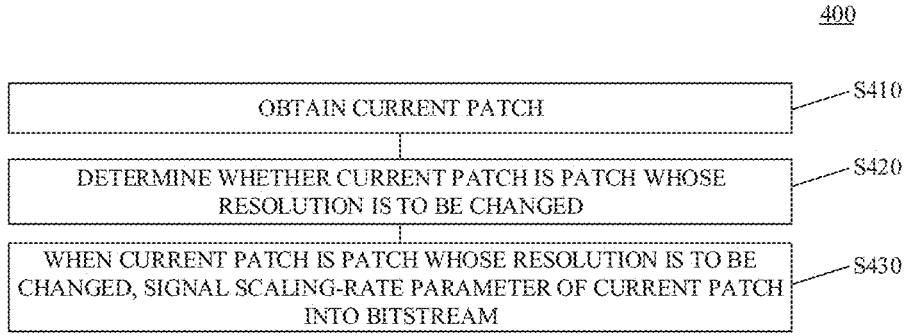
FIG. 9 is a schematic flowchart of a resolution-based encoding method provided in embodiments of the disclosure.

FIG. 9 is a schematic flowchart of a resolution-based encoding method 400 provided in embodiments of the disclosure.

As illustrated in FIG. 9, the encoding method 400 may include the following.

At S410, a current patch is obtained.

At S420, whether the current patch is a patch whose resolution is to be changed is determined.

At S430, when the current patch is a patch whose resolution is to be changed, a scaling-rate parameter of the current patch is signalled into the bitstream.

In some embodiments, operations at S430 may include the following. The scaling-rate parameter of the current patch and a first flag are signalled into the bitstream, where a value of the first flag being a first value indicates that the current patch is a patch whose resolution is to be changed, and the value of the first flag being a second value indicates that the current patch is a patch whose resolution is not to be changed.

In some embodiments, operations at S420 may include the following. Whether a current atlas where the current patch is located contains patches with different resolutions is determined. When the current atlas contains patches with different resolutions, whether the current patch is a patch whose resolution is to be changed is determined.

In some embodiments, the operations at S430 may include the following. The scaling-rate parameter of the current patch and a second flag are signalled into the bitstream, where a value of the second flag being a third value indicates that the current atlas contains patches with different resolutions, and the value of the second flag being a fourth value indicates that the current atlas contains patches with a same resolution.

In some embodiments, the operations at S420 may include the following. Whether a current view where the current patch is located contains patches with different resolutions is determined. When the current view contains patches with different resolutions, whether the current patch is a patch whose resolution is to be changed is determined.

In some embodiments, the operations at S430 may include the following. The scaling-rate parameter of the current patch and a third flag are signalled into the bitstream, where a value of the third flag being a fifth value indicates that the current view contains patches with different resolutions, and the value of the third flag being a sixth value indicates that the current view contains patches with a same resolution.

In some embodiments, the method 400 may further include the following. When the current patch is a patch whose resolution is not to be changed, a default value of the scaling-rate parameter of the current patch is signalled into the bitstream.

In some embodiments, the method 400 may further include the following. The scaling-rate parameter of the current patch is determined based on at least one of the following information: a size of the current patch, a motion vector of the current patch, a rate-distortion cost of the current patch, a richness of details of the current patch, or a variance of the current patch.

In some embodiments, the scaling-rate parameter of the current patch is determined as a first parameter, when the current patch satisfies at least one of the following conditions: the size of the current patch is greater than a first threshold, the motion vector of the current patch is less than or equal to a second threshold, the rate-distortion cost of the current patch is greater than a third threshold, the richness of the details of the current patch is less than or equal to a fourth threshold, or the variance of the current patch is less than or equal to a fifth threshold. When the current patch fails to satisfy any one of the conditions, the scaling-rate parameter of the current patch is determined as a second parameter, where the first parameter is greater than the second parameter.

In some embodiments, when the scaling-rate parameter of the current patch includes a width scaling-rate parameter, the scaling factor for the current patch includes a width-scaling factor corresponding to the width scaling-rate parameter; and/or when the scaling-rate parameter of the current patch includes a height scaling-rate parameter, the scaling factor for the current patch includes a height-scaling factor corresponding to the height scaling-rate parameter.

The solutions of the disclosure will be described below in combination with specific embodiments.

Embodiment 2

In this embodiment, the encoding end may execute part or all of the following operations.

Step 1

All views are obtained. For each view, mvp_view_wise_enabled_flag[viewID] is signalled into the bitstream, where mvp_view_wise_enabled_flag[viewID] indicates whether the view contains patches with different resolutions. When a value of mvp_view_wise_enabled_flag[viewID] indicates YES, it indicates that the view contains patches with different resolutions. When the value of mvp_view_wise_enabled_flag[viewID] indicates NO, it indicates that the view does not contain patches with different resolutions.

Step 2

After whether a certain view contains patches with different resolutions is determined, all patches in the certain view can be obtained. For each patch in the certain view, corresponding pdu_scaled_flag may be signalled into the bitstream, where pdu_scaled_flag may indicate whether the corresponding patch is a patch whose resolution is to be changed.

If the flag indicates YES, it indicates that Method 1 is used. If the flag indicates NO, it indicates that Method 2 is used.

Method 1

After it is determined that a certain patch in a certain view is a patch whose resolution is to be changed, a width scaling-rate parameter and a height scaling-rate parameter are obtained by a certain means, and the width scaling-rate parameter and the height scaling-rate parameter of the certain patch need to be signalled into the bitstream.

Method 2

After it is determined that a certain patch in a certain view is a patch whose resolution is not to be changed, a width scaling-rate parameter of the certain patch may be signalled into the bitstream as a default value 1, and a height scaling-rate parameter of the certain patch may be signalled into the bitstream as a default value 1.

Step 3

After the above operations are performed on all patches in all views, the patches are stitched to generate atlases. For each atlas, whether the atlas contains patches with different resolutions is determined, and asme_scaled_enabled_flag is signalled into the bitstream, where asme_scaled_enabled_flag indicates whether a corresponding atlas contains patches with different resolutions. If asme_scaled_enabled_flag indicates YES, it indicates that the corresponding atlas contains patches with different resolutions. If asme_scaled_enabled_flag indicates NO, it indicates that the corresponding atlas does not contain patches with different resolutions.

Step 4

The encoder may determine a scaling-rate parameter of each patch by using at least one of the following methods.

Method 1

The encoder may determine a scaling-rate parameter of a patch through comparison of a size of the patch. For example, if the size of the patch is greater than a certain threshold, a relatively large scaling-rate parameter may be selected. If the size of the patch is less than or equal to a certain threshold, a relatively small scaling-rate parameter may be selected.

Method 2

The encoder may determine a scaling-rate parameter of a patch through comparison of a motion vector of the patch. For example, if the motion vector of the patch is less than or equal to a certain threshold, a relatively large scaling-rate parameter may be selected. If the motion vector of the patch is greater than a certain threshold, a relatively small scaling-rate parameter may be selected.

Method 3

The encoder may determine a scaling-rate parameter of a patch through comparison of a rate-distortion cost of the patch. For example, if the rate-distortion cost of the patch is greater than a certain threshold, a relatively large scaling-rate parameter may be selected. If the rate-distortion cost of the patch is less than or equal to a certain threshold, a relatively small scaling-rate parameter may be selected.

Method 4

The encoder may determine a scaling-rate parameter of a patch through comparison of a richness of details of the patch. For example, if the richness of the details of the patch is small, a relatively large scaling-rate parameter may be selected. If the richness of the details of the patch is large, a relatively small scaling-rate parameter may be selected.

Method 5

The encoder may determine a scaling-rate parameter of a patch through comparison of a variance of the patch. For example, if the variance of the patch is less than a certain threshold, a relatively large scaling-rate parameter may be selected. If the variance of the patch is greater than a certain threshold, a relatively small scaling-rate parameter may be selected.

Example 1

It is assumed that a view with index viewID1 contains patches with different resolutions. In a case where the encoding end obtains patch P1 with index patch1 and the patch P1 is a patch whose resolution is to be changed, when a size of the patch P1 is 64*64, a relatively large width scaling-rate parameter and a relatively large height scaling-rate parameter may be selected. In a case where the encoding end obtains patch P2 with index patch2 and the patch P2 is a patch whose resolution is to be changed, when a size of the patch P2 is 32*32, a relatively small width scaling-rate parameter and a relatively small height scaling-rate parameter may be selected. In a case where the encoding end obtains patch P3 with index patch3 and the patch P3 is a patch whose resolution is not to be changed, both a width scaling-rate parameter and a height scaling-rate parameter of the patch P3 may have a default value 1. In a case where the encoding end obtains patch P4 with index patch4 and the patch P4 is a patch whose resolution is to be changed, when a variance of the patch P4 is relatively large, relatively small width and height scaling-rate parameters may be selected.

Example 2

It is assumed that a view with index viewID2 contains patches with different resolutions. In a case where the encoding end obtains patch P1 with index patch1 and the patch P1 is a patch whose resolution is to be changed, when texture of the patch P1 is relatively rich, relatively small width and height scaling-rate parameters may be selected. In a case where the encoding end obtains patch P2 with index patch2 and the patch P2 is a patch whose resolution is not to be changed, both a width scaling-rate parameter and a height scaling-rate parameter of the patch P2 may have a default value 1.

Example 3

It is assumed that a view with index viewID3 contains patches with the same resolution. In a case where the encoding end obtains patch P1 with index patch1 and the patch P1 is a patch whose resolution is not to be changed, both a width scaling-rate parameter and a height scaling-rate parameter of the patch P1 may have a default value 1. In a case where the encoding end obtains patch P2 with index patch2 and the patch P2 is a patch whose resolution is not to be changed, both a width scaling-rate parameter and a height scaling-rate parameter of the patch P2 may have a default value 1.

The method embodiments of the disclosure are described in detail above, and the apparatus embodiments of the disclosure will be described in detail below with reference to FIG. 10 to FIG. 12.

Figure 10:
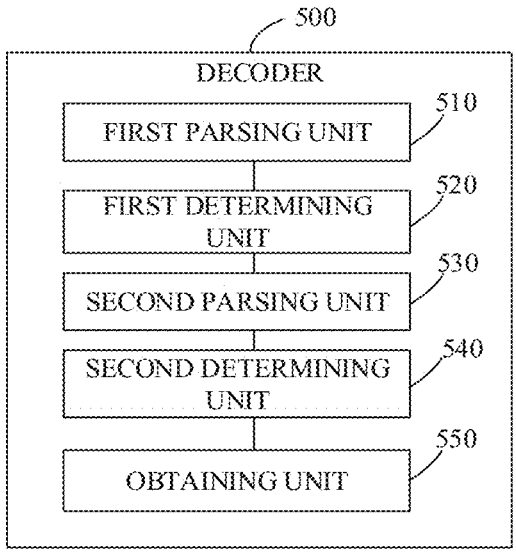
FIG. 10 is a schematic block diagram of a decoder provided in embodiments of the disclosure.

FIG. 10 is a schematic block diagram of a decoder 500 provided in embodiments of the disclosure.

As illustrated in FIG. 10, the decoder 500 may include a first parsing unit 510, a first determining unit 520, a second parsing unit 530, a second determining unit 540, and an obtaining unit 550. The first parsing unit 510 is configured to parse a bitstream to obtain a current patch. The first determining unit 520 is configured to determine whether the current patch is a patch whose resolution is to be changed. The second parsing unit 530 is configured to parse the bitstream to obtain a scaling-rate parameter of the current patch, when the current patch is a patch whose resolution is to be changed. The second determining unit 540 is configured to determine a scaling factor for the current patch based on the scaling-rate parameter of the current patch. The obtaining unit 550 is configured to obtain coordinates of the current patch in a 3D space coordinate system based on the scaling factor for the current patch.

In some embodiments, the first determining unit 520 is specifically configured to parse the bitstream to obtain a value of a first flag. The value of the first flag being a first value indicates that the current patch is a patch whose resolution is to be changed, and the value of the first flag being a second value indicates that the current patch is a patch whose resolution is not to be changed.

In some embodiments, the first determining unit 520 is specifically configured to determine whether a current atlas where the current patch is located contains patches with different resolutions. The first determining unit 520 is further configured to determine whether the current patch is a patch whose resolution is to be changed, when the current atlas contains patches with different resolutions.

In some embodiments, the first determining unit 520 is specifically configured to parse the bitstream to obtain a value of a second flag. The value of the second flag being a third value indicates that the current atlas contains patches with different resolutions, and the value of the second flag being a fourth value indicates that the current atlas contains patches with a same resolution.

In some embodiments, the first determining unit 520 is specifically configured to determine whether a current view where the current patch is located contains patches with different resolutions. The first determining unit 520 is further configured to determine whether the current patch is a patch whose resolution is to be changed, when the current view contains patches with different resolutions.

In some embodiments, the first determining unit 520 is specifically configured to parse the bitstream to obtain a value of a third flag. The value of the third flag being a fifth value indicates that the current view contains patches with different resolutions, and the value of the third flag being a sixth value indicates that the current view contains patches with a same resolution.

In some embodiments, the second determining unit 540 is specifically configured to determine the scaling-rate parameter of the current patch as the scaling factor for the current patch.

In some embodiments, the second determining unit 540 is further configured to determine the scaling-rate parameter of the current patch as a default value, when the current patch is a patch whose resolution is not to be changed.

In some embodiments, the obtaining unit 550 is specifically configured to obtain first coordinates of the current patch in a 2D atlas coordinate system, obtain second coordinates of the current patch in a 3D patch coordinate system based on the first coordinates and the scaling factor, and obtain the coordinates of the current patch in the 3D space coordinate system by un-projecting the second coordinates to the 3D space coordinate system.

In some embodiments, the obtaining unit 550 is specifically configured to obtain the second coordinates by projecting the current patch to the 3D patch coordinate system based on the first coordinates, the scaling factor, and a transform parameter. The transform parameter includes a transform process for characterizing a swap operation and/or a transform process for characterizing an invert operation.

In some embodiments, when the scaling-rate parameter of the current patch includes a width scaling-rate parameter, the scaling factor for the current patch includes a width-scaling factor corresponding to the width scaling-rate parameter; and/or when the scaling-rate parameter of the current patch includes a height scaling-rate parameter, the scaling factor for the current patch includes a height-scaling factor corresponding to the height scaling-rate parameter.

It may be understood that, apparatus embodiments and method embodiments correspond to each other. For similar elaborations, reference can be made to the method embodiments. Specifically, the decoder 500 illustrated in FIG. 10 may correspond to a corresponding entity for implementing the method 300 in embodiments of the disclosure, and the above and other operations and/or functions of various units of the decoder 500 are respectively intended for implementing corresponding operations in the method 300, which will not be repeated herein.

Figure 11:
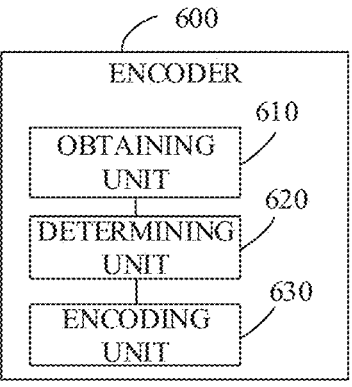
FIG. 11 is a schematic block diagram of an encoder provided in embodiments of the disclosure.

FIG. 11 is a schematic block diagram of an encoder 600 provided in embodiments of the disclosure.

As illustrated in FIG. 11, the encoder 600 may include an obtaining unit 610, a determining unit 620, and an encoding unit 630. The obtaining unit 610 is configured to obtain a current patch. The determining unit 620 is configured to determine whether the current patch is a patch whose resolution is to be changed. The encoding unit 630 is configured to signal a scaling-rate parameter of the current patch into a bitstream, when the current patch is a patch whose resolution is to be changed.

In some embodiments, the encoding unit 630 is specifically configured to signal the scaling-rate parameter of the current patch and a first flag into the bitstream. A value of the first flag being a first value indicates that the current patch is a patch whose resolution is to be changed, and the value of the first flag being a second value indicates that the current patch is a patch whose resolution is not to be changed.

In some embodiments, the determining unit 620 is specifically configured to determine whether a current atlas where the current patch is located contains patches with different resolutions. The determining unit 620 is further configured to determine whether the current patch is a patch whose resolution is to be changed, when the current atlas contains patches with different resolutions.

In some embodiments, the encoding unit 630 is specifically configured to signal the scaling-rate parameter of the current patch and a second flag into the bitstream. A value of the second flag being a third value indicates that the current atlas contains patches with different resolutions, and the value of the second flag being a fourth value indicates that the current atlas contains patches with a same resolution.

In some embodiments, the determining unit 620 is specifically configured to determine whether a current view where the current patch is located contains patches with different resolutions. The determining unit 620 is further configured to determine whether the current patch is a patch whose resolution is to be changed, when the current view contains patches with different resolutions.

In some embodiments, the encoding unit 630 is specifically configured to signal the scaling-rate parameter of the current patch and a third flag into the bitstream. A value of the third flag being a fifth value indicates that the current view contains patches with different resolutions, and the value of the third flag being a sixth value indicates that the current view contains patches with a same resolution.

In some embodiments, the encoding unit 630 is further configured to signal a default value of the scaling-rate parameter of the current patch into the bitstream, when the current patch is a patch whose resolution is not to be changed.

In some embodiments, the determining unit 620 is further configured to determine the scaling-rate parameter of the current patch based on at least one of the following information: a size of the current patch, a motion vector of the current patch, a rate-distortion cost of the current patch, a richness of details of the current patch, or a variance of the current patch.

In some embodiments, the determining unit 620 is specifically configured to determine the scaling-rate parameter of the current patch as a first parameter when the current patch satisfies at least one of the following conditions: the size of the current patch is greater than a first threshold, the motion vector of the current patch is less than or equal to a second threshold, the rate-distortion cost of the current patch is greater than a third threshold, the richness of the details of the current patch is less than or equal to a fourth threshold, or the variance of the current patch is less than or equal to a fifth threshold. The determining unit 620 is further configured to determine the scaling-rate parameter of the current patch as a second parameter when the current patch fails to satisfy any one of the conditions, where the first parameter is greater than the second parameter.

In some embodiments, when the scaling-rate parameter of the current patch includes a width scaling-rate parameter, the scaling factor for the current patch includes a width-scaling factor corresponding to the width scaling-rate parameter; and/or when the scaling-rate parameter of the current patch includes a height scaling-rate parameter, the scaling factor for the current patch includes a height-scaling factor corresponding to the height scaling-rate parameter.

It may be understood that, apparatus embodiments and method embodiments correspond to each other. For similar elaborations, reference can be made to the method embodiments. Specifically, the encoder 600 illustrated in FIG. 11 may correspond to a corresponding entity for implementing the method 400 in embodiments of the disclosure, and the above and other operations and/or functions of various units of the encoder 600 are respectively intended for implementing corresponding operations in the method 400, which will not be repeated herein.

It may be further understood that, units of the decoder 500 or encoder 600 involved in embodiments of the disclosure may be separately or wholly combined into one or several other units, or one (or more) of the units herein may further be partitioned into multiple units of smaller functions. In this way, same operations can be implemented, and implementation of the technical effects of the embodiments of the disclosure is not affected. The foregoing units are partitioned based on logical functions. During actual implementation, a function of one unit may also be implemented by multiple units, or functions of multiple units are implemented by one unit. In other embodiments of the disclosure, the decoder 500 or encoder 600 may also include other units. During actual implementation, the functions may also be cooperatively implemented by other units and may be cooperatively implemented by multiple units. According to another embodiment of the disclosure, a computer program (including program codes) that can perform the operations involved in the corresponding method may be run on a general-purpose computing device such as a general-purpose computer, which includes processing elements and storage elements such as a central processing unit (CPU), a random access memory (RAM), and a read-only memory (ROM), to construct the decoder 500 or encoder 600 involved in embodiments of the disclosure and implement the encoding method or the decoding method provided in embodiments of the disclosure. The computer program may be recorded in, for example, a computer-readable storage medium, and may be loaded into an electronic device through the computer-readable storage medium, and run in the electronic device, to implement the corresponding method in embodiments of the disclosure.

In other words, the units mentioned above may be implemented in the form of hardware, may be implemented by instructions in the form of software, or may be implemented in the form of a combination of software and hardware. Specifically, the operations of the method embodiments in embodiments of the disclosure may be completed by a hardware integrated logical circuit in a processor and/or by instructions in a form of software. The operations of the methods disclosed with reference to embodiments of the disclosure may be directly implemented by using a hardware decoding processor, or may be performed by using a combination of hardware and software in the decoding processor. Optionally, the software may be located in a storage medium mature in the skill, such as a random access memory, a flash memory, a read-only memory, a programmable read-only memory, an electrically-erasable programmable memory, or a register. The storage medium is located in the memory. The processor reads information from the memory and completes the operations of the foregoing method embodiments in combination with hardware thereof.

Figure 12:
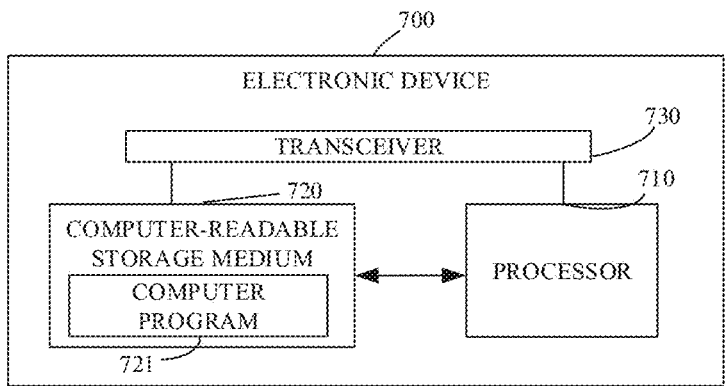
FIG. 12 is a schematic block diagram of an electronic device provided in embodiments of the disclosure.

FIG. 12 is a schematic structural diagram of an electronic device 700 provided in embodiments of the disclosure.

As illustrated in FIG. 12, the electronic device 700 at least includes a processor 710 and a computer-readable storage medium 720. The processor 710 and the computer-readable storage medium 720 may be connected to each other through a bus or in another manner. The computer-readable storage medium 720 is configured to store a computer program 721 and the computer program 721 includes computer instructions, and the processor 710 is configured to execute the computer instructions stored in the computer-readable storage medium 720. The processor 710 is the computing core and control core of the electronic device 700. The processor 710 is suitable for implementing one or more computer instructions, and is suitable for loading and executing the one or more computer instructions to implement a corresponding method procedure or a corresponding function.

As an example, the processor 710 may also be called a CPU. The processor 710 includes, but is not limited to, a general-purpose processor, a digital signal processor (DSP), an application specific integrated circuit (ASIC), a field programmable gate array (FPGA), or another programmable logic device, a discrete gate, a transistor logic device, or a discrete hardware component.

As an example, the computer-readable storage medium 720 may be a high-speed RAM memory, or may be a non-volatile memory, such as at least one magnetic disk memory. Optionally, the computer-readable storage medium 720 may also be at least one computer-readable storage medium far away from the processor 710. Specifically, the computer-readable storage medium 720 includes, but is not limited to, a volatile memory and/or a non-volatile memory. The non-volatile memory may be an ROM, a programmable read-only memory (PROM), an erasable PROM (EPROM), an electrically EPROM (EEPROM), or a flash memory. The volatile memory may be an RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

Exemplarily, the electronic device 700 may be the encoding end, the encoder, or the encoding framework involved in embodiments of the disclosure. The computer-readable storage medium 720 stores a first computer instruction. The first computer instruction stored in the computer-readable storage medium 720 is loaded and executed by the processor 710, to implement corresponding operations in the encoding method or the decoding method provided in embodiments of the disclosure. In other words, the first computer instruction in the computer-readable storage medium 720 is loaded and executed by the processor 710 to perform corresponding operations, which will not be repeated herein.

Exemplarily, the electronic device 700 may be the decoding end, the decoder, or the decoding framework involved in embodiments of the disclosure. The computer-readable storage medium 720 stores a second computer instruction. The second computer instruction stored in the computer-readable storage medium 720 is loaded and executed by the processor 710, to implement corresponding operations in the encoding method or the decoding method provided in embodiments of the disclosure. In other words, the second computer instruction in the computer-readable storage medium 720 is loaded and executed by the processor 710 to perform corresponding operations, which will not be repeated herein.

According to another aspect of the disclosure, a computer-readable storage medium (memory) is further provided in embodiments of the disclosure. The computer-readable storage medium is a memory device in the electronic device 700 and is configured to store programs and data. For example, the computer-readable storage medium is the computer-readable storage medium 720. It may be understood that the computer-readable storage medium 720 herein may include an internal storage medium in the electronic device 700, and may also include an extended storage medium supported by the electronic device 700. The computer-readable storage medium provides a storage space, and the storage space stores an operating system of the electronic device 700. In addition, the storage space further stores one or more computer instructions suitable for being loaded and executed by the processor 710, and the one or more computer instructions may be the one or more computer programs 721 (including program codes).

According to another aspect of the disclosure, a computer program product or a computer program is provided. The computer program product or the computer program includes computer instructions, and the computer instructions are stored in a computer-readable storage medium. For example, the computer instructions are the computer programs 721. In this case, the electronic device 700 may be a computer, the processor 710 reads the computer instructions from the computer-readable storage medium 720 and executes the computer instructions, to cause the computer to perform the encoding method or decoding method provided in the above optional implementations.

In other words, when implemented by software, all or part of the functions can be implemented in the form of a computer program product. The computer program product includes one or more computer instructions. When the computer instructions are loaded and executed on a computer, all or part of the operations or functions of the embodiments of the disclosure are performed. The computer may be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instructions can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

Finally, the foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A resolution-based decoding method, comprising:
parsing a bitstream to obtain a current patch;
determining whether the current patch is a patch whose resolution is to be changed;
parsing the bitstream to obtain a scaling-rate parameter of the current patch, when the current patch is a patch whose resolution is to be changed;
determining a scaling factor for the current patch based on the scaling-rate parameter of the current patch; and
obtaining coordinates of the current patch in a three-dimension (3D) space coordinate system based on the scaling factor for the current patch;
wherein:
the scaling factor for the current patch comprises a width-scaling factor corresponding to a width scaling-rate parameter, in response to the scaling-rate parameter of the current patch comprising the width scaling-rate parameter; and/or
the scaling factor for the current patch comprises a height-scaling factor corresponding to a height scaling-rate parameter, in response to the scaling-rate parameter of the current patch comprising the height scaling-rate parameter.

2. The method of claim 1, wherein determining whether the current patch is a patch whose resolution is to be changed comprises:
parsing the bitstream to obtain a value of a first flag;
wherein the value of the first flag being a first value indicates that the current patch is a patch whose resolution is to be changed, and the value of the first flag being a second value indicates that the current patch is a patch whose resolution is not to be changed.

3. The method of claim 1, wherein determining whether the current patch is a patch whose resolution is to be changed comprises:
determining whether a current atlas where the current patch is located contains patches with different resolutions; and
determining whether the current patch is a patch whose resolution is to be changed, when the current atlas contains patches with different resolutions.

4. The method of claim 3, wherein determining whether the current atlas where the current patch is located contains patches with different resolutions comprises:
parsing the bitstream to obtain a value of a second flag;
wherein the value of the second flag being a third value indicates that the current atlas contains patches with different resolutions, and the value of the second flag being a fourth value indicates that the current atlas contains patches with a same resolution.

5. The method of claim 1, wherein determining whether the current patch is a patch whose resolution is to be changed comprises:
determining whether a current view where the current patch is located contains patches with different resolutions; and
determining whether the current patch is a patch whose resolution is to be changed, when the current view contains patches with different resolutions.

6. The method of claim 5, wherein determining whether the current patch is a patch whose resolution is to be changed comprises:
parsing the bitstream to obtain a value of a third flag;
wherein the value of the third flag being a fifth value indicates that the current view contains patches with different resolutions, and the value of the third flag being a sixth value indicates that the current view contains patches with a same resolution.

7. The method of claim 1, wherein determining the scaling factor for the current patch based on the scaling-rate parameter of the current patch comprises:
determining the scaling-rate parameter of the current patch as the scaling factor for the current patch.

8. The method of claim 1, further comprising:
determining the scaling-rate parameter of the current patch as a default value, when the current patch is a patch whose resolution is not to be changed.

9. The method of claim 1, wherein obtaining the coordinates of the current patch in the 3D space coordinate system based on the scaling factor for the current patch comprises:
obtaining first coordinates of the current patch in a two-dimension (2D) atlas coordinate system;
obtaining second coordinates of the current patch in a 3D patch coordinate system based on the first coordinates and the scaling factor; and
obtaining the coordinates of the current patch in the 3D space coordinate system by un-projecting the second coordinates to the 3D space coordinate system.

10. The method of claim 9, wherein obtaining the second coordinates of the current patch in the 3D patch coordinate system based on the first coordinates and the scaling factor comprises:
obtaining the second coordinates by projecting the current patch to the 3D patch coordinate system based on the first coordinates, the scaling factor, and a transform parameter;
wherein the transform parameter comprises a transform process for characterizing a swap operation and/or a transform process for characterizing an invert operation.

11. A resolution-based encoding method, comprising:
obtaining a current patch;
determining whether the current patch is a patch whose resolution is to be changed; and
signalling a scaling-rate parameter of the current patch into a bitstream, when the current patch is a patch whose resolution is to be changed;

wherein:

a scaling factor for the current patch comprises a width-scaling factor corresponding to a width scaling-rate parameter, in response to the scaling-rate parameter of the current patch comprising the width scaling-rate parameter; and/or the scaling factor for the current patch comprises a height-scaling factor corresponding to a height scaling-rate parameter, in response to the scaling-rate parameter of the current patch comprising the height scaling-rate parameter.

12. The method of claim 11, wherein signalling the scaling-rate parameter of the current patch into the bitstream comprises:

signalling the scaling-rate parameter of the current patch and a first flag into the bitstream;

wherein a value of the first flag being a first value indicates that the current patch is a patch whose resolution is to be changed, and the value of the first flag being a second value indicates that the current patch is a patch whose resolution is not to be changed.

13. The method of claim 11, wherein determining whether the current patch is a patch whose resolution is to be changed comprises:

determining whether a current atlas where the current patch is located contains patches with different resolutions; and determining whether the current patch is a patch whose resolution is to be changed, when the current atlas contains patches with different resolutions.

14. The method of claim 13, wherein signalling the scaling-rate parameter of the current patch into the bitstream comprises:

signalling the scaling-rate parameter of the current patch and a second flag into the bitstream;

wherein a value of the second flag being a third value indicates that the current atlas contains patches with different resolutions, and the value of the second flag being a fourth value indicates that the current atlas contains patches with a same resolution.

15. The method of claim 11, wherein determining whether the current patch is a patch whose resolution is to be changed comprises:

determining whether a current view where the current patch is located contains patches with different resolutions; and determining whether the current patch is a patch whose resolution is to be changed, when the current view contains patches with different resolutions.

16. The method of claim 15, wherein signalling the scaling-rate parameter of the current patch into the bitstream comprises:

signalling the scaling-rate parameter of the current patch and a third flag into the bitstream;

wherein a value of the third flag being a fifth value indicates that the current view contains patches with different resolutions, and the value of the third flag being a sixth value indicates that the current view contains patches with a same resolution.

17. The method of claim 11, further comprising:

signalling a default value of the scaling-rate parameter of the current patch into the bitstream, when the current patch is a patch whose resolution is not to be changed.

18. A bitstream generated according to a resolution-based encoding method, the method comprising:

obtaining a current patch;

determining whether the current patch is a patch whose resolution is to be changed; and signalling a scaling-rate parameter of the current patch into a bitstream, when the current patch is a patch whose resolution is to be changed;

wherein:

a scaling factor for the current patch comprises a width-scaling factor corresponding to a width scaling-rate parameter, when the scaling-rate parameter of the current patch comprises the width scaling-rate parameter; and/or the scaling factor for the current patch comprises a height-scaling factor corresponding to a height scaling-rate parameter, when the scaling-rate parameter of the current patch comprises the height scaling-rate parameter.

* * * * *